United States Patent

[11] 3,622,569

| [72] | Inventors | Raymond Urgel Lemieux;<br>Rintje Raap; Clinton Gordon Chin; Ronald George Micetich, all of Alberta, Canada |
|---|---|---|
| [21] | Appl. No. | 847,744 |
| [22] | Filed | Aug. 5, 1969 |
| [45] | Patented | Nov. 23, 1971 |
| [73] | Assignee | R & L Molecular Research, Ltd.<br>Edmonton Province, Alberta, Canada |

[54] 6-(2-ARYL-3-AZIDO-AND-3-AMINO-METHYL-ISOCROTONAMIDO)PENICILLANIC ACIDS
27 Claims, No Drawings

| [52] | U.S. Cl. | 260/239.1, 424/271 |
| [51] | Int. Cl. | C07d 99/16 |
| [50] | Field of Search | 260/239.1 |

[56] References Cited
FOREIGN PATENTS
63/2423  5/1963  South Africa ............... 260/239.1

*Primary Examiner*—Nicholas S. Rizzo
*Attorneys*—Herbert W. Taylor, Jr., Robert E. Havranek, Richard H. Brink and James Magee ABSTRACT: 6-(2-Aryl-3-azido- and 3-amino-methyl-isocrotonamido)penicillanic acids are valuable as antibacterial agents, as nutritional supplements in animal feeds and as therapeutic agents in poultry and animals, including man, and are especially useful in the treatment of infectious diseases caused by Gram-positive and Gram-negative organisms. For example, 6-(3-aminomethyl-2-phenyliso-crotonamido)penicillanic acid is prepared by catalytic hydrogenation (Pd-C) of potassium 6-(3-azidomethyl-2-phenylisocrotonamido)penicillanate which in turn is prepared by reaction of 6-aminopenicillanic acid with 3-aizdomethyl-2-phenylisocrotonyl chloride.

6-(2-ARYL-3-AZIDO-AND-3-AMINO-METHYL-ISOCROTONAMIDO)PENICILLANIC ACIDS

BACKGROUND OF THE INVENTION

1. Field of The Invention

The compounds of the present invention are penicillins which possess the usual attributes of such compounds and are particularly useful in the treatment of bacterial infections. They also exhibit β-lactamase resistance.

2. Description of the Prior Art

Preparation and study of penicillins having the structure $$A-C=C-C-APA$$
$$\quad\; B \;\; C \;\; O$$

in which substituent C is not connected to either substituent A or B (i.e., other than the acylation of 6-aminopenicillanic acid (6-APA) with crotonyl chloride and cinnamoyl chloride by Doyle et al. as described in U.S. Pat. No. 2,941,995 and continued as described in U.S. Pat. Nos. 3,040,032, 3,174,964, 3,256,272 and U. K. Pat. Nos. 877,323 and 877,531. In all of the compounds described therein B was hydrogen and in all except those of 3,256,273 C was also hydrogen and in no case was C an aromatic substituent such as phenyl, thienyl, etc. nor did A carry an azido- or amino-substituent.

There are, of course, numerous penicillins such as ampicillin or azidocillin which do contain an amino or azido group attached to a much different side-chain as illustrated by U.S. Pat. Nos. 2,985,648, 3,293,242 and 3,228,930.

SUMMARY OF THE INVENTION

The compounds of the present invention have the formula

[structural formula]

wherein B is amino or azido and Ar is

[structural formulas of aryl groups with $R^1$, $R^2$, $R^3$, $R^4$ substituents, thienyl, N-methylpyrrolyl, furyl, naphthyl groups]

in which $R^1$ and $R^2$ are each hydrogen, fluoro, chloro, methoxy or methyl and $R^3$ and $R^4$ are each hydrogen bromo or chloro; or a nontoxic, pharmaceutically acceptable salt thereof.

The preferred compounds of the present invention are a penicillin having the formula

[structural formula]

wherein B is amino or azido, $R^1$ and $R^2$ are each hydrogen, fluoro, chloro, methoxy or methyl; or a nontoxic, pharmaceutically acceptable salt thereof and a penicillin having the formula

[structural formula]

wherein B is amino or azido and Ar is 2-thienyl, 3-thienyl, 5-chloro-2-thienyl, 3,5-dichloro-2-thienyl, 3,5-dibromo-2-thienyl or 2,5-dichloro-3-thienyl; or a nontoxic, pharmaceutically acceptable salt thereof. A smaller group of preferred embodiments of the present invention comprises the penicillins described above in which $R^2$ is hydrogen.

The pharmaceutically acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N'-bis-dehydroabietylethylenediamine, N-(lower)alkylpiperidines, e.g. N-ethylpiperidine, and other amines which have been used to form salts with benzylpenicillin.

Also included within the scope of the present invention are easily hydrolyzed esters which are converted to the free acid form by chemical or enzymatic hydrolysis, as illustrated in Belgian Pat. No. 684,288 and U.S. Pat. No. 3,399,207.

The amino-substituted compounds of the present invention also form nontoxic acid addition salts (i.e. of the amino group) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like. These compounds also exist in the form of internal salts or zwitter-ions.

DETAILED DESCRIPTION

The azido compounds of the present invention are prepared by the process which comprises mixing an acylating agent of the formula

[structural formula with Ar, C-Z, $N_3H_2C$, $CH_3$]

wherein Ar is as defined above and wherein Z is chloro, bromo, iodo, or a radical of the formula $$-O-\overset{O}{\underset{\|}{C}}-CCl_3, \quad -O-\overset{O}{\underset{\|}{C}}-O-\text{(lower)alkyl}$$

or

[structural formula with $R^5$, $R^6$ on phenyl ring, -O- attached]

in which $R^5$ and $R^6$ are selected from the group consisting of hydrogen, nitro, $SO_3H$, CN or (lower)-alkyl; but preferably

[structural formula with $R^5$, $NO_2$ on phenyl ring]

or a "functional equivalent" of the acylating agent; with 6-aminopenicillanic acid, preferably in a ratio of about 1.0 to 2.0 equivalents of the acylating agent per equivalent of the 6-aminopenicillanic acid, in the presence of a base, preferably an organic base such as a pyridine, N-methylpiperidine, tri(lower)alkyl-amine, or the like, but preferably in the presence of pyridine or triethylamine, preferably in the ratio of about one to three moles of amine per mole of 6- aminopenicillanic acid, in an inert solvent such as dimethylformamide, dimethylsulfoxide, chloroform, tetrahydrofuran or methylene chloride, but preferably methylene chloride, at a temperature in the range of about −20° C. to 50° C., but preferably about 0° C. to 20° C., for a period of time of about 30 minutes to about 5 hours, but preferably about 1 to 3 hours, with rapid agitation to produce a compound having the formula

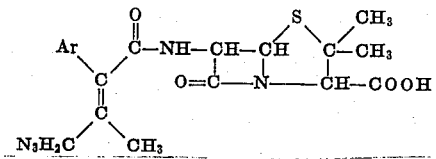

wherein Ar is as defined above or a salt thereof.

Functional equivalents include the corresponding acid halides, anhydrides, including mixed anhydrides and particularly the mixed anhydrides prepared from stronger acids such as the lower aliphatic monoeseters of carbonic acid, of alkyl and aryl sulfonic acids and of more hindered acids such as diphenylacetic acid. In addition, an acid azide or an active ester or thioester (e.g., with p-nitrophenol, 2,4-dinitrophenol, thiopehnol, thioacetic acid) may be used or the free acid itself may be coupled with 6-aminopenicillanic acid after first reacting said free acid with N,N'-dimethyl-chloroformiminium chloride [cf. Great Britain Pat. No. 1,008,170 and Novak and Weichet, Experientia XXI/6, 360 (1965) ] or by the use of enzymes or of an N,N'-carbonyldithiazole [cf. South African patent specification 63/2684] or a carbodiimide reagent [especially N,N'-dicyclohexyl-carbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew, Chem. International Edition 3, 582 (1964)], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent is a corresponding azolide, i.e., an amide of the corresponding acid whose amide nitrogen is a member of a quasi-aromatic five-membered ring containing at least two nitrogen atoms, i.e., imida-zole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. The byproduct, imidazole, precipitates and may be separated and the imidazolide isolated, but this is not essential. The methods for carrying out these reactions to produce a penicillin and the methods used to isolate the penicillin and the methods used to isolate the penicillin so produced are well-known in the art.

"Readily available" source of phamaceutically acceptable nontoxic cation such as sodium, potassium, calcium, aluminum, or the like, is defined for the purpose of the present invention to mean: a metal hydroxide, i.e., sodium hydroxide, calcium hydroxide, ammonium hydroxide, or the like; a weak acid salt of a strong base, i.e., sodium or potassium 2-ethylhexanoate, or the like; a pharmaceutically acceptable nontoxic amine capable of forming a procaine, dibenzylamine, N-benzyl-β-phenethylamine, 1-ephenamine, N,N'-dibenzylethylenediamine, dehydroabietylamine, N,N'bis-dehydroabietylethylenediamine, N-(lower)alkylpiperidine, or other such amines which have been used to form pharmaceutically acceptable nontoxic salts with benzylpenicillins.

The amino compounds of the present invention are prepared by the process which comprises catalytically hydrogenating a compound of the formula

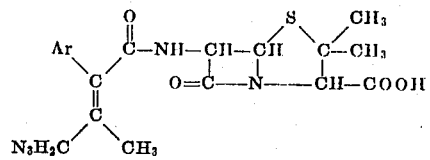

wherein Ar is as defined above, or a salt thereof to produce a compound of the formula

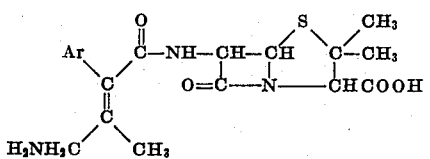

or its corresponding salt.

The catalytic hydrogenation is carried out in a suitable solvent, preferably water at room temperature or higher and at atmospheric pressure or above. The preferred catalyst is palladium but other catalysts such as platinum, rhodium or nickel, e.g. Raney nickel, are also suitable. The catalyst may be supported, e.g. on charcoal or on an alkaline earth metal carbonate.

In the treatment of bacterial infections in man, the compounds of this invention are administered topically, orally and parenterally, but preferably parenterally, in accordance with conventional procedures for antibiotic administration in an amount of from about 5 to 125 mg./kg./day and preferably in the range of 35 to 85 mg./kg./day in divided dosages, e.g. three or four times a day. They are administered in dosage units containing, for example, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The following examples will serve to illustrate this invention without limiting it thereto. All temperatures are given in degrees Centigrade.

DESCRIPTION OF THE PREFERRED EMBODIMENTS

Example 1

Potassium 6-(2-Aryl-3-azidomethylisocrotonamido)pencillanates (general procedure)

The isocrotonic acid (0.010 mole) was allowed to react with thionyl chloride (25 ml.) for a certain period of time (temperature and conditions tabulated below in example 3). The excess of thionyl chloride was removed completely and a solution of the acid chloride in approximately 15 ml. of methylene chloride was dropwise added in 5 minutes to a stirred solution of triethylammonium 6-aminopenicillanate, prepared from triethylamine (0.020 mole) and 6–APA (0.010 mole), in 25 ml. of methylene chloride cooled at −20° to −40° C. The cooling bath was removed and the mixture was allowed to reach ambient temperature in 2 hours. The methylene chloride was removed and the residue was dissolved in 50 ml. of water. The aqueous solution was layered with 50 ml. of ether, cooled in ice and with stirring brought to pH 2.0 –2.5 by the addition of 1 N hydrochloric acid. The ether layer was separated [in some instances a filtration through diatomaceous earth ("Celite") was necessary to break up the emulsion] and the aqueous layer extracted once more with ether. The combined ether solutions were dried (MgSO₄) and treated with 4 ml. of 2.4 M solution of potassium 2-ethyl-hexanote in n-butyl alcohol. Depending on the solubility of the penicillin some additional ether or some n-hexane was added. The solvent was decanted from the precipitate which was then triturated with ether until it crystallized completely. The potassium penicillanate was then dissolved in the minimum amount of methanol and reprecipitated by the addition of ether. The solid was filtered off, washed with ether and rapidly transferred to a desiccator in which it was dried *in vacuo* over phosphorus pentoxide for several hours. The purity of the penicillin was estimated after examination of the thin-layer chromatogram and the infrared and n.m.r. spectra. The penicillins thus prepared are tabulated below in example 3. As a specific example, the preparation of potassium 6-[3-azido-methyl-2-(3',4'-dichloro-phenyl)isocrotonamido]pencillianate follows.

Example 2

Potassium 6-[3-azidomethyl-2-(3',4'-dichlorophenyl)isocrotonamido]penicillanate

Crude 3-azidomethyl-2-(3',4'-dichlorophenyl)isocrotonic acid (14.0 g., 0.049 mole) was allowed to react at room temperature with 100 ml. of thionyl chloride for 2 hours. The solution had to be cooled occasionally in order to prevent the reaction temperature from exceeding 25°. The excess of thionyl chloride was removed completely and the darkly colored crude acid chloride was dissolved in 60 ml. of methylene chloride. This solution was added dropwise in 5 minutes to a stirred solution of 6-aminopenicillanic acid (10.6 g., 0.049 mole) and triethylamine (9.9 g., 0.098 mole) in 120 ml. of methylene chloride at approximately −40°. The cooling bath was removed and the reaction mixture allowed to reach ambient temperature in 1 hour. The solvent was removed and the residue dissolved in 150 ml. of water. This solution was cooled in ice, layered with 150 ml. of ether and with stirring adjusted to pH 2.5 by the addition of 1 N hydrochloric acid. The layers were separated (a filtration through "Celite" was necessary to break up the emulsion) and, after drying over MgSO₄, the ether layer was treated with a 2.3 M solution of potassium 2-ethylhexanoate in n-butyl alcohol until no more precipitate formed (15 ml.). The solvent was decanted and the residue triturated with ether until it crystallized. The solid was filtered off, washed thoroughly with ether and dried *in vacuo* over P₂O₅. Yield, 12.7 g. (50 percent of yellow colored, solid potassium 6-[3-azidomethyl-2-(3',4'-dichlorophenyl)isocrotonamido] penicillanate. The infrared spectrum (Nujol Mull) contained bands at 2090, 1760, 1660 and 1600 cm.⁻¹, ascribed to the azide, β-lactam carbonyl, amide carbonyl and the carboxylate group respectively. The purity was estimated to 80 percent from the n.m.r. spectrum and from the thin-layer chromatogram.

Example 3

Use in the procedure of example 1 of the appropriate isocrotonic acid gave the following potassium 6-(2-aryl-3-azidomethylisocrotonamido)penicillanates prepared via the acid chloride:

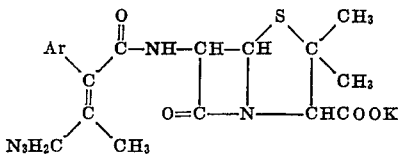

palladium on charcoal (1-2 g.) and water (50-100 ml.) was hydrogenated with 15-20 p.s.i. of hydrogen for 16 hours. The mixture was filtered through "Celite" and the darkly colored filtrate cooled in ice and adjusted to pH 2.0 with dilute acid. A voluminous precipitate was removed by filtration through "-Celite." The clear and almost colorless filtrate was adjusted to pH 5.5–6.0 with dilute base and then concentrated to dryness under reduced pressure while the bath temperature was kept below 30°. The solid residue was twice treated with a few ml. of methanol and filtered. The methanol soluble material was reprecipitated by the addition of ether. This precipitate was then subjected to chromatography on "Sephadex-G10." The penicillin was eluted with water and the eluate collected in 10 ml. fractions. On the basis of thin-layer chromatograms (a system containing n-butyl alcohol, acetic acid and water in a ratio 3:1:1 respectively was used) the proper fractions were chosen, combined and freeze-dried to give the penicillin as a white solid in 80–90 percent purity. Example 6 lists the amino penicillins thus prepared, including their yields and purities. As an example, the detailed procedure for 6-[3-aminomethyl-2-(3',4'-dichlorophenyl)isocrotonamido]penicillanic acid is given below in example 5.

"Sephadex-G10" is a molecular seive material which is a modified dextran obtained by fermentation of sugar, in which the linear macromolecules of dextran are cross-linked to give a three-dimensional network of polysaccharide chains. A suitable material is commercially available under the name "-Sephadex" (Registered Trade Mark).

Example 5

6-[3-Aminomethyl-2-(3',4'-dichlorophenyl)isocrotonamido]-penicillanic acid

A mixture of potassium 6-[3-azidomethyl-2-(3',4'-dichlorophenyl)isocrotonamido] penicillanate (12.5 g., 0.024 mole), 10 percent palladium-on-charcoal (4.0 g.) and water (200 ml.) was hydrogenated with 15 p.s.i. of hydrogen for 16 hours. The mixture was filtered through "Celite," the filtrate cooled in ice and the pH adjusted to 2.9 a large amount of precipitate was formed which was removed by another "-Celite" filtration. From an ethyl acetate extract of the material collected by filtration was obtained, after drying and removal of ethyl acetate, 8.3 g. of brownish colored solid from which 3.0 g. of the azido penicillin used as starting material was recovered when the ether soluble material was treated with a potassium 2-ethylhexanoate solution. The aqueous filtrate from the "Celite" filtration was adjusted to pH 6.0 and concentrated to dryness under reduced pressure. The solid residue (1.9 g.) was treated with a total of 12 ml. of methanol. The methanol insoluble material (1.1 g.) was inorganic material according to the infrared spectrum. The methanol

| Ar | Conditions for reaction of acid with SOCl₂ | Percent yield of penicillin | Percent purity | M.I.C. mcg./ml. S. aureus Smith | 1633 [1] |
|---|---|---|---|---|---|
| C₆H₅ | 1.5 hours at 15 to 20° | 33 | 90 | .23 | 1.3 |
| p-ClC₆H₄ | 1.5 hours at 25° | 47 | 80 | .11 | 0.45 |
| 2,4-Cl₂C₆H₃ | 4 hours at 25° | 55 | 85 | .08 | 0.6 |
| o-ClC₆H₄ | 1.25 hours at 10° | 49 | 90 | .11 | 0.45 |
| p-CH₃C₆H₄ | 1 hour at 0° | 50 | 85 | .16 | 0.6 |
| 3,4-Cl₂C₆H₃ | 2 hours at 25° | 50 | 80 / (²) | .08 / .06 | 0.45 / 125 |

[1] 10³ dilution of the 18 hour culture used as inoculum.
[2] Ampicillin.

Example 4

6-(3-Aminomethyl-2-arylisocrotonamido)penicillanic acids. (general procedure)

A mixture of potassium 6-(3-azidomethyl-2-arylisocrotonamido)penicillanate (0.010 mole), 10 percent solution was treated with ether and the grayish precipitate filtered off. This material (0.65 g.) was purified by chromatography on Sephadex-G10 (column of 90 cm. in length and 2 cm. in diameter). The penicillin was eluted with water and the eluate collected in 10 ml. fractions. On the basis of ninhydrin tests and thin-layer chromatograms fractions 17–24 were combined and concentrated to dryness to give 0.19 g. (2.3 percent) of white crystalline, solid 6-[3-aminomethyl-2-(3',4'-dichlorophenyl)isocrotonamido]-penicillanic acid which was sparingly soluble in water (most of the material precipitated from the aqueous solution upon concentration). The n.m.r. and infrared spectra were in full agreement with the assigned structure. The purity of the material was estimated to be 90 percent.

Example 6

Use in the procedure of example 5 of the appropriate azidopenicillin gave the following 6-(3-aminomethyl-2-aryl-isocrotonamido)penicillanic acids:

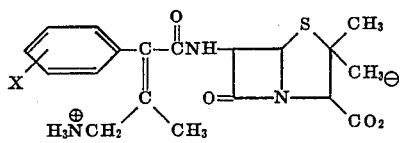

| X | Percent yield from azido penicillin | Percent purity | M.I.C. mcg./ml. S. aureus | |
|---|---|---|---|---|
| | | | Smith | 1633 [1] |
| H | 18 | 85 | 1.0 | 5 |
| p-Cl | 5 | 80 | 0.6 | 0.8 |
| o-Cl | 11 | 90 | 1.3 | 2.5 |
| 2,4-Cl$_2$ | 4 | 80 | 0.08 | 0.6 |
| 3,4-Cl$_2$ | 2.3 | 90 | 0.3 | 0.45 |
| p-CH$_3$ | 20 | 90 | 0.3 | 0.6 |
| | | ([2]) | 0.6 | 125 |

[1] 10³ dilution of the 18 hour culture used as inoculum.
[2] Ampicillin.

Example 7

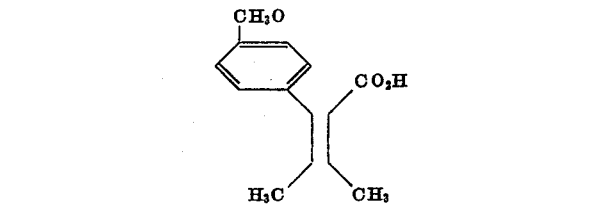

↓ NBS

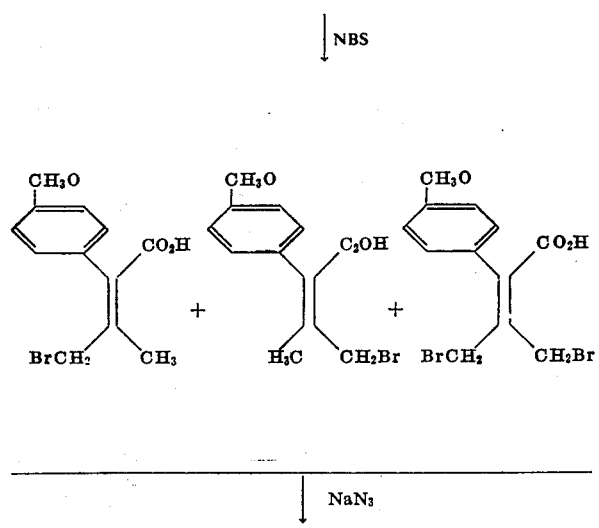

↓ NaN$_3$

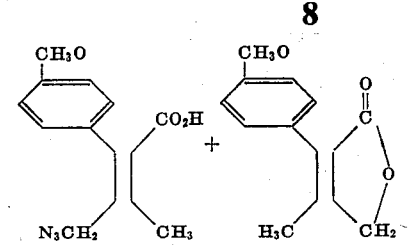

1. SOCl$_2$
2. 6 APA⊖(C$_2$H$_5$)$_3$NH⊕
3. K2-ethylhexanoate

1. H$_2$/Pd-C
2. pH 5.5–6.0

6-(3'-Aminomethyl-2'-p-methoxyphenylisocrotonamido)penicillanic acid. 3-Azidomethyl-2-p-methoxyphenyl-isocrotonic acid A mixture of 2-p-methoxyphenyl-3-methyl-crotonic acid (5.1 g., 0.025 mole), N-bromosuccinimide (4.5 g., 0.025 mole), benzoyl peroxide (0.2 g.) and carbon tetrachloride (100 ml.) was heated under reflux for 45 min. while illuminated with a 100 watt light source. The mixture was cooled, the succinimide filtered off and the solvent removed under reduced pressure. The liquid residue (8.1 g.) consisted predominately of 3-bromomethyl-2-p-methoxyphenyl-isocrotonic acid (approximately 60 percent) but also contained approximately 20 percent of 3-bromomethyl-2-p-methoxyphenylcrotonic acid and approximately 10 percent each of 4-bromo-3-bromomethyl-2-p-methoxyphenylcrotonic acid and 2-p-methoxyphenyl-3-methyl-crotonic acid, as indicated by the nuclear magnetic resonance spectrum. A solution of the crude bromo acid in 90 ml. of acetone was treated with a solution of sodium azide (1.63 g., 0.025 mole) in 10 ml. of water. The reaction mixture was stirred at room temperature for 16 hours. The mixture was concentrated under reduced pressure and water (25 ml.) and ether (50 ml.) were added to the residue. The layers were separated and the water layer extracted with ml. of ether. The combined ether solutions were extracted with a saturated aqueous sodium carbonate solution (2×15 ml.). The alkaline extract was cooled and acidified with 6 N hydrochloric acid. The precipitated oil was extracted with ether (3×60 ml.). The ether solution was dried (MgSO$_4$) and the ether removed leaving 3.1 g. (50 percent overall) of pale yellow oil as residue. The infrared spectrum (Nujol mull) showed strong absorption at 2100 and 1685 cm.$^{-1}$ ascribed to the azide and the carboxyl group respectively. The n.m.r. spectrum (CDCl$_3$) contained, besides some low intensity signals due to impurities, a broad band at $\tau$1.4 (CO$_2$H), an AB quartet centered at $\tau$2.97 (phenyl protons) and singlets at $\tau$6.22 (overlapping OCH$_3$ and N$_3$CH$_2$), and 7.81 (CH$_3$) with the expected integration ratio.

The neutral material (1.8 g. of a solid), isolated by drying and removal of the ether, consisted of a mixture of lactones as indicated by a strong band at 1745 cm.$^{-1}$ in the infrared spectrum and a weaker band at 2100 cm.$^{-1}$.

Potassium 6(3'-azidomethyl-2'-p-methoxyphenylisocrotonamido)penicillanate

3-Azidomethyl-2-p-methoxyphenylisocrotonic acid (2.7 g., 0.0109 mole) was allowed to react with 30 ml. of thionyl chloride for 1.5 hours at 0°. Removal of the excess of thionyl chloride gave 3.0 g. of brownish colored liquid acid chloride. A solution of the acid chloride in 10 ml. of methylene chloride was added dropwise in 5 min. to a stirred solution of 6-aminopenicillanic acid (2.4 g., 0.0109 mole) and triethylamine (2.2 g., 0.0218 mole) in 20 ml. of methylene chloride cooled at approximately −40°. The cooling bath was removed and the mixture was allowed to reach ambient temperature in 1.5 hours. The solvent was removed and water (40 ml.) and ether (40 ml.) were added to the residue. The mixture was cooled in ice and the pH adjusted to 2.1 with dilute hydrochloric acid. The layers were separated (a filtration through diatomaceous earth ("Celite") was necessary to break up the emulsion) and, after drying over MGSO$_4$, the ether solution was treated with 4.5 ml. of a 2.3 M solution of potassium 2-ethylhexanoate in n-butyl alcohol. The solid was collected by filtration and twice dissolved in a small amount of methanol followed by precipitation with ether to give 2.5 g. (48 percent) of potassium 6-(3'-azidomethyl-2'-p-methoxyphenylisocrotonamido)-penicillanate as a yellow solid after drying *in vacuo* over P$_2$O$_5$. The infrared spectrum (Nujol mull) contained bands at 2090, 1760, 1650 and 1600 cm.$^{-1}$ ascribed to the azide, $\beta$-lactam carbonyl, amide carbonyl and the carboxylate group respectively. The purity was estimated at 85 percent from the n.m.r. spectrum and from the thin-layer chromatogram.

6-(3'-Aminomethyl-2'-p-methoxyphenylisocrotonamido)-penicillanic acid

A mixture of potassium 6-(3'-azidomethyl-2'-p-methoxyphenylisorcrotonamido)penicillanate (2.5 g., 0.0052 mole), 10 percent palladium on charcoal (0.8 g.) and water (50 ml.) was hydrogenated with 15 p.s.i. of hydrogen for 16 hours after which the mixture was filtered through "Celite." The filtrate was cooled in ice and adjusted to pH 2.1 with dilute hydrochloric acid and the resulting precipitate removed by another filtration through "Celite." Next, the pH was brought to 5.9 with dilute aqueous sodium hydroxide and the mixture concentrated to dryness under reduced pressure while the bath temperature was kept below 30°. The solid residue (0.85 g.) was treated, at room temperature, with 6 ml. of methanol. The insoluble white solid was washed with two 2 ml. portions of methanol. The methanol insoluble product (0.26 g.) was inorganic material according to the infrared spectrum. The combined filtrate and washings were treated with approximately 50 ml. of ether. The slightly colored solid was collected by filtration, washed thoroughly with ether and dried *in vacuo* over P$_2$O$_5$. This product (0.45 g.) was combined with another batch (0.77 g.) of identical material prepared by the same procedure and chromatographed on Sephadex C-10 (column of 80 cm. in length and 2 cm. in diameter). The penicillin was eluted with water and the eluate collected in 10 ml. fractions. On basis of ninhydrin tests and thin-layer chromatograms fractions 11 and 12 were combined and concentrated to dryness under reduced pressure to give 0.56 g. (15 percent yield from the azido penicillin) of 6-(3'-aminomethyl-2'-p-methoxyphenylisocrotonamido)penicillanic acid as a pale yellow solid. The infrared spectrum (Nujol mull) contained a sharp band at 1775 cm.$^{-1}$ ascribed to the $\beta$-lactam carbonyl and a strong broad band at 1610 cm.$^{-1}$. The n.m.r. spectrum (D$_2$O) contained two doublets (with spacings 8.5 c.p.s.) of an AB quartet at $\tau$2.70 and 3.00 (phenyl protons), two almost overlapping doublets of an AB quartet at $\tau$4.49 ($\beta$-lactam protons) and sharp singlets at $\tau$5.77 (3-thiazolidine proton), 6.23 (OCH$_3$), 6.33 (aminomethylene protons), 7.96 (allylic methyl group), 8.50 and 8.55 (gem.-dimethyl groups); the integrated areas were consistent with the assignments. On basis of the n.m.r. spectrum and the thin-layer chromatogram the purity of the penicillin was estimated at 85percent.

PREPARATION OF STARTING MATERIALS

2-Aryl-3-methylcrotonic acids

The esters of these acids were synthesized by either one of the two procedures outlined in scheme 1.

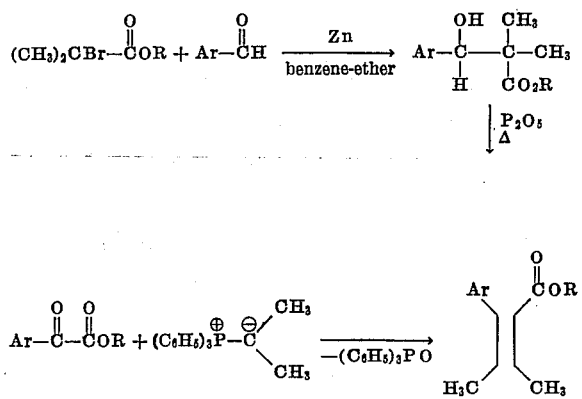

SCHEME 1

3-Aryl-2,2-dimethyl-3-hydroxypropanoic esters are readily obtained from a Reformatsky reaction between an aromatic aldehyde and an $\alpha$-halo isobutyric ester. As has been shown by E. E. Blaise and A. Courtot [Bull. Soc. Chim. (Paris), 35 (3), 589 (1906)]2,2-dimethyl-3-hydroxy-3-phenylpropanoic ester upon heating with phosphorous pentoxide gives a curious rearrangement resulting in the formation of 3-methyl-2-phenylcrotonic ester. This reaction proved to be applicable to a large number of halogen-substituted phenyl derivatives as well; however, the attempted phosphorous pentoxide rearrangement of ethyl 2,2-dimethyl-3-hydroxy-3-(3'-thienyl)-propanoate resulted in complete decomposition. Table IA lists the various 3-aryl-2,2-dimethyl-3-hydroxy-propanoic esters thus prepared.

A Wittig reaction between an arylglyoxylic ester and isopropylidene-tirphenylphosphorane represents a second and more versatile method leading to 2-aryl-3-methylcrotonic esters. Some of the arylglyoxylic esters prepared for this purpose are listed in table II.

A good method leading to arylglyoxylic esters has been described by M. Julia and M. Baillarge [Bull. Soc. Chim. France, 850 (1959)] involving the reaction of benzoyl chloride (cf. Org. Synth., Coll. Vol III, p. 112) or substituted benzoyl chlorides with cuprous cyanide to give the benzoyl cyanides which upon reaction with an alcohol and hydrogen chloride are converted to imino ester hydrochlorides. Subsequent hydrolysis with dilute acid gives rise to the arylglyoxylic ester. The compounds prepared by this procedure are given in Table IB A more direct method leading to the arylglyoxylic esters was provided by a Friedel-Craft reaction using methyl or ethyl oxalyl chloride as the acylating agent. This method was especially useful for preparing thienylglyoxylic esters. Table IC lists the keto esters that were prepared by this method.

The 2-aryl-$\alpha,\beta$-unsaturated esters prepared by either one of two above outlined procedures are given in table III. Hydrolysis to the acids (table IV) could best be effected under acidic conditions as treatment with sodium hydroxide gave rise to considerable decomposition. The hydrolyses were carried out by heating under reflux in approximately 1:1 mixtures of 6 N hydrochloric acid and acetic acid.

2-Aryl-3-bromomethylisocrotonic esters

Bromination of methyl 3-methyl-2-phenylcrotonate with N-bromosuccinimide in carbon tetrachloride gives rise to a complex product mixture as was indicated by the n.m.r. spectrum. By distillation however a fair yield of methyl 3-bromomethyl-2-phenylisocrotonate (1) could be isolated. A substantial amount of the lactone 2 was also obtained from the distillation.

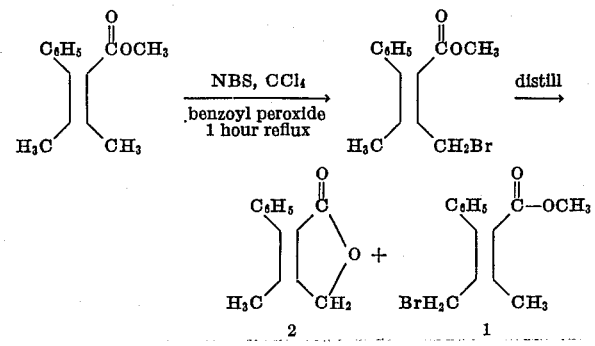

When methyl 3-methyl-2-phenylcrotonate (3) was heated under reflux in carbon tetrachloride with one equivalent of N-bromosuccinimide in the presence of a catalytic amount of benzoyl peroxide, a rapid allylic bromination took place which was completed within one hour. A n.m.r. spectrum taken of the reaction product prior to distillation showed the presence of both methyl 3-bromomethyl-2-phenylisocrotonate (4) and methyl 3-bromomethyl-2-phenylcrotonate (5) in a ratio of approximately 5:2 respectively. Upon heating this mixture in vacuo, a decomposition took

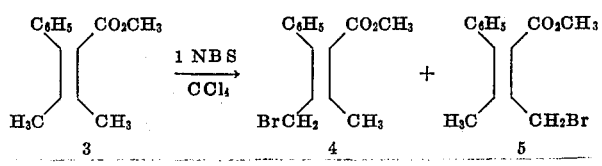

place at approximately 100°-120°as was evident by the increase in pressure. When the pressure decreased again to its original value the mixture was fractionally distilled to give a 37 percent yield of pure methyl 3-bromomethyl-2-phenylisocrotonate (4), b.p. 107°-112° (0.8 mm.). Not a trace of compound 5 was found in any of the distillation fractions but instead there was obtained a high boiling fraction, b.p. 134°-152° (0.7 mm.), which solidified upon cooling. The solid was recrystallized into white plates, m.p. 84°-86°, from carbon tetrachloride and on basis of the infrared and n.m.r. spectra and the elemental analyses it was assigned the structure of 3-hydroxymethyl-2-phenycrotonic acid lactone (6). As the n.m.r. spectrum of the crude bromination product indicated the absence of this material, it became obvious that the lactone 6 resulted from the bromo ester 5, presumably by the loss of methyl bromide. The NBS-bromination

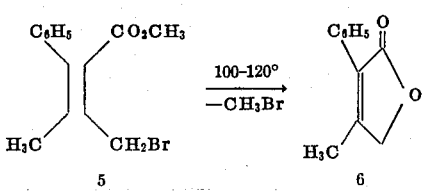

when carried out with some phenyl-substituted crotonic esters took a similar course. In each case the n.m.r. spectrum indicated the crude product to be a mixture of the two isomeric bromo esters. Upon distillation the 3-bromomethyl-2-arylisocrotonic ester as obtained pure whereas the other isomer decomposed to the 3-hydroxymethyl-2-arylcrotonic acid lactone. In the case of ethyl 2-(5-chloro-2-thienyl)-3-methylcrotonate both bromo compounds decomposed upon distillation and the lactone was the only isolated product. Table V reports the n.m.r. chemical shifts of the allylic methyl and methylene groups and the approximate isomer ratios of some of the bromination reactions carried out. Table VI contains the yields, boiling points and n.m.r. chemical shifts of the 3-bromoethyl-2arylisocrotonic esters that were prepared. Table VII lists the 3-hydroxmethyl-2-arylcrotonic acid lactones isolated as a byproduct in these preparations and includes some physical constants, 3-Aryl-2,2-dimethyl-3-hydroxypropanoic Esters (general procedure)

The Reformatsky reactions were carried out by the procedure given by E. E. Blaise and A. Gourtot [Bull. Soc. Chim.(Paris), 35(3), 589 (1906)]and by A. I. Vogel (Practical Organic Chemistry, 3rd Edition, p875 ) as follows: A small portion of a mixture containing the aromatic aldehyde (0.50 mole), $\alpha$-bromoisobutyric ester (0.50 mole), benzene (80 ml.)and ether (40 ml.) was added to zinc powder (0.50 g. at). The zinc was purified by the procedure given in Org. Synth., Coll. Vol. III, p. 409, or, even better, "nascent" zinc was employed (commercially available as "VIRDUST-N" containing 1–2percent oil which was removed by washing with n-hexane, from Virginia Chemicals Inc., West Norfolk, Va., U.S.A.). The reaction mixture was heated until the exothermic reaction started, then the remainder of the solution was added with stirring at such a rate that refluxing was maintained without applying external heat. When the addition was completed the reaction mixture was heated under reflux for an additional 30 min. After cooling the mixture was poured into 200 ml. 3 N aqueous sulfuric acid under vigorous stirring. The organic layer was successively washed with dilute sulfuric acid, 10 percent aqueous sodium carbonate and water. The solution was dried (MgSO$_4$), the solvent removed and the residue distilled in vacuo. The products prepared in this manner are listed in table IA. Arylglyoxylic Esters Methyl phenylglyoxylate was obtained commercially from Aldrich Chemical Company. Ethyl p-chlorophenylglyoxylate and ethyl 2,4-dichlorophenylglyoxylate were prepared from the respective benzol cyanides by reaction with ethanolic hydrogen chloride followed by reaction of the imino esters with water, according to the procedure of M. Julia and M. Baillargé [Bull. Soc. Chim. France, 850 (1959)]. Methyl 2-thienylgloxylate was obtained by reaction of an ethereal diazomethane solution with 2-thienylglyoxylic acid. The ethyl esters of 2-thiazolylglyoxylic acid, 3,5-dibromo-2-thienylgloxylic acid and 1-naphthylglyoxylic acid were all prepared by allowing the aryllithium compound to react with an excess of diethyl oxalate by the following general procedure.

To a solution of either thiazole, 2,3,5-tribromothiophene or 1-bromonaphthalene (0.20 mole) in 300 ml. of anhydrous tetrahydrofuran was added dropwise at 65°C. in a nitrogen atmosphere, 125 ml. of a 1.6 M n-butyllithium solution in n-hexane. The aryllithium solution was slowly siphoned, in approximately 20 min., into a stirred mixture of diethyl oxalate (0.60 mole) and ether (200 ml.) maintained at approximately −60° C. The reaction mixture was allowed to warm to 0°C. and then poured into 200 ml. of ice-cold 2 N hydrochloric acid. The product was extracted with three 100 ml. portions of ether. After the ether extract had been dried over $MgSO_4$ the solvent was removed and the residue fractionally distilled *in vacuo*.

t-Butyl phenylglyoxylate was prepared from phenylglyoxylic acid as follows: To a solution of phenylglyoxylic acid (54.0 g., 0.36 mole; Org. Synth., Coll. Vol. III, p, 114) in 300 ml. of anhydrous ether, cooled in an ice-salt mixture was carefully added under stirring, 30 ml. of concentrated sulfuric acid. The mixture was then cooled in dry ice-acetone and isobutylene (45.0 g., 0.80 mole) was added. The reaction mixture was allowed to warm slowly to 0°C. and kept at 0°C. for 1 day. It was then poured into 200 ml. of ice water. The ether layer was washed with water, then with 2N aqueous sodium carbonate until the washings were alkaline. The ether solution was dried with $MgSO_4$, whereafter the solvent was removed and the residue distilled *in vacuo* to give 51.7 g. (70percent) of the desired product, b.p. 86°–93° C. (0.5–0.8 mm.). The aryglyoxylic esters prepared and their boiling points and yields are listed in table II. Arylglyoxylic esters.

a. from aroyl cyanides via the imino esters:

The aroyl cyanides were prepared from the corresponding chlorides by heating with cuprous cyanide according to procedures given by M. Julia and M. Baillargé [Bull. Soc. Chim. France, 850 (1959)]and T. S. Oakwood and C. A. Weisgerber (Org. Synth., Coll. Vol. III p. 112). The aroyl cyanide was allowed to react at 0° with a saturated alcoholic hydrogen chloride solution, preferably for 48 hours, according to the procedure of Julia and Baillargé. The imino ester hydrochloride could be isolated by filtration after the addition of ether, whereafter it was converted to the glyoxylic ester by treatment with 3 N hydrochloric acid. The isolation of the imino ester was however not necessary and the reaction mixture could also be treated with dilute acid directly. In some instances the methyl ester was prepared by reaction of the aroyl cyanide at 0° for 24 hours with an equivalent amount of methanol in ether saturated with hydrogen chloride, whereafter the imino ester hydrochloride was filtered off and treated with dilute acid. The aroyl cyanides and arylglyoxylic esters prepared by this method are listed in table IB.

b. by a Friedel-Craft reaction:

A solution of aluminum trichloride (100 g., 0.75 mole) in nitromethane (200 ml. was added 0.75 to a stirred mixture of alkyl oxalyl chloride (0.75 mole) and the aryl or heteroaryl compound (0.50 mole), cooled in ice, at such a rate that the reaction temperature did not exceed 10°. After the addition was completed the reaction mixture was stirred at 10° for 1 hour and then at ambient temperature for another hour, after which it was poured carefully into a mixture of ice and water (1.5 1) layered with ether (150 ml.). The aqueous layer was extracted with ether (3×100 ml.) and the combined ether layers washed with dilute aqueous sodium carbonate, dried ($MgSO_4$), filtered and solvent removed. The residue was distilled under reduced pressure. Table IC lists the arylglyoxylic esters made by this route.

Methyl and ethyl oxalyl chloride were prepared by a modified procedure of R. Anschutz [Ann. 254, 1 (1889)[as follows: Dimethyl or diethyl oxalate (2.0 mole) was heated with phosphorous pentachloride (2.1 mole) at 130°–135° for 16 hours, followed by fractional distillation of the product mixture. In the case of methyl oxalyl chloride the phosphorous oxychloride could be removed completely by distillation at atmospheric pressure or slightly reduced pressure, leaving a residue consisting of methyl 2,2-dichloro-2-methoxyacetate. The latter compound upon addition of a small amount of aluminum trichloride at approximately 120° readily lost methyl chloride and when the distillation was continued methyl oxalyl chloride, b.p. 117°–120° (700 mm.) was obtained in almost quantitative yield. Ethyl oxalyl chloride was formed directly in the reaction with phosphorous pentachloride and upon distillation it codistilled with phosphorous oxychloride. This mixture however could be used in Friedel-Craft reactions.

2-Aryl-3-methylcrotonic Esters a. from 3-aryl-2,2-dimethyl-3-hydroxypropanoic esters with $P_2O_5$:

The following general procedure was found to be most suitable: A solution of the hydroxypropanoic ester (0.10 mole) in 20 ml. of benzene was added dropwise in approximately 5 min. under vigorous stirring to a suspension of phosphorus pentoxide (0.09 mole) in 40 ml. of benzene. The reaction mixture was heated and the benzene allowed to distill off at atmospheric pressure (the last traces of benzene were removed under reduced pressure). The reaction flask was then connected to a vacuum pump and immersed in an oil bath heated at approximately 200° C. All volatile material was collected by distillation *in vacuo*. The product was purified by a fractional distillation.

b. from arylglyoxylic esters via a Wittig reaction:

In a nitrogen atmosphere a 1.6 M solution of n-butyllithium in N-hexane (64 ml., 0.10 mole of butyllithium) was dropwise added in approximately 30 min. to a stirred suspension of isopropyltriphenylphosphonium bromide [U. H. M. Fagerlund and D. R. Idler, J. Am. Chem. Soc. 79, 6473 (1957)](38.5 g., 0.10 mole) in 200 ml. of anhydrous tetrahydrofuran, cooled at 0° C. After the addition of n-butyllithium was completed the mixture was stirred for an additional 30 min. at 0° C., then a solution of arylglyoxylic ester (0.10 mole) in 50 ml. of tetrahydrofuran was added in one portion. The cooling bath was removed and the reaction mixture was left at ambient temperature for approximately 3 hours (frequently the mixture was left overnight). Some solid material was filtered off and the solvent was removed from the filtrate. To the residue was added 100 ml. of water and the organic material was extracted with two 100 ml. portions of ether. The ether solution was dried ($MgSO_4$) and the ether removed. The residue was treated with n-hexane (and a small amount of benzene) and, after cooling, the solid triphenylphosphine oxide was filtered off. The filtrate was concentrated and the residue distilled *in vacuo* to give the desired product.

2-Aryl-3-methylcrotonic esters by the Wittig reaction

A general procedure for the preparation of these esters is given above. As specific examples the preparations of methyl 3-methyl-2-phenylcrotonate and ethyl 2-(3,4-dichlorophenyl)-3-methylcrotonate are given below in detail.

Isopropyltriphenylphosphonium bromide

A mixture of triphenylphosphine (393 g., 1.5 mole) and 2-bromopropane (185 g., 1.5 mole) was heated in an autoclave at 150°–155° for 16 hours. The solid product was powdered and washed with ether to give 550 g. (96 percent) of a white solid which could be used for the Wittig reaction without further purification.

Methyl 3-methyl-2-phenylcrotonate

In a nitrogen atmosphere a 1.6 M solution of n-butyllithium in n-hexane (400 ml., 0.645 mole of butyllithium) was dropwise added in 45 min. to a stirred suspension of isopropyltriphenylphosphonium bromide (247 g., 0.645 mole) in 1 L of anhydrous tetrahydrofuran, cooled at 0°. After the addition was completed the mixture was stirred for an additional 30 min. at 0°, then a solution of methyl phenylglyoxylate (105.5 g., 0.645 mole) in 250 ml. of tetrahydrofuran was added rapidly. The reaction was allowed to come to room temperature slowly overnight. Some solid material was filtered off and the solvent was removed from the filtrate. To the residue was added 400 ml. of water and the product extracted with 400 ml. of ether. The ether extract was dried (MgSO$_4$) and the ether removed. The addition of n-hexane to the residue resulted in a precipitate of triphenylphosphine oxide, which was removed by filtration. The filtrate was concentrated and the residue distilled *in vacuo* to give 81.2 g. (66 percent) of colorless liquid, b.p. 76°–78° (0.5 mm.), which crystallized upon cooling: m.p. 31°–34°. Reported [E. E. Blaise and A. Courtot, Bull. Soc. Chim. (Paris) 35 (3), 589(1906)]: b.p. 142° (26 mm.), m.p. 32°. In the infrared spectrum of the neat liquid the carboxyl group absorbed at 1720 cm.$^{-1}$. The n.m.r. spectrum (CCl$_4$) contained three methyl singlets at $\tau$6.40, 7.88 and 8.34 in addition to a phenyl multiplet.

Ethyl 2-(3,4-dichlorophenyl)-3-methylcrotonate

In a nitrogen atmosphere a 1.6 M n-butyllithium solution in n-hexane (250 ml., 0.40 mole) was added dropwise in 30 min. to a stirred suspension of isopropyltriphenylphosphonium bromide (152 g., 0.40 mole) in 600 ml. of anhydrous tetrahydrofuran, cooled at 0°. The mixture was kept at 0° for an additional 30 min., then a solution of ethyl 3,4-dichlorophenylglyoxylate was added in one portion. The reaction mixture was allowed to come to room temperature slowly and left overnight. The solvent was removed, the residue treated with some water and the organic material extracted with ether. The ether extract was dried, the ether removed and the residue treated with n-hexane. The precipitated triphenylphosphine oxide was filtered off, the filtrate concentrated and the product distilled *in vacuo* to give 62.8 g. (58 percent) of colorless liquid, b.p. 110°–115° (0.3 mm.). An infrared spectrum of the neat liquid showed the carboxyl group as a strong band at 1715 cm.$^{-1}$.

2-Aryl-3-methylcrotonic Acids (general procedure)

The ester (1.0 g.) was heated under reflux in a mixture of acetic acid (10 ml.) and 6 N hydrochloric acid (5–10 ml., depending on the solubility of the ester) for the time indicated in table IV. Generally the acid precipitated by diluting the mixture with approximately 50 ml. of water and cooling. In other instances the acetic acid was removed under reduced pressure, the residue diluted with water and the product extracted with ether. The acids prepared are listed in table IV together with their melting points, solvents of recrystallization and the chemical shifts of the methyl groups in the n.m.r. spectra.

A general procedure for the acid hydrolysis of the esters was given above. 3-methyl-2-o-tolylcrotonic acid was also prepared by hydrolysis of the methyl ester using boron tribromide by he procedure given below.

3-Methyl-2-o-tolylcrotonic acid

A solution of boron tribromide (3.75 g., 0.015 mole) in 5 ml. of methylene chloride was dropwise added to a stirred solution of methyl 3-methyl-2-o-tolylcrotonate (3.05 g., 0.015 mole) in 15 ml. of methylene chloride, cooled in an ice-salt mixture, at such a rate that the temperature of the reaction mixture did not exceed 0°. When the addition was completed the cooling bath was removed and the mixture left at ambient temperature for 1 hour. The solvent was removed and the residue stirred for 15 min. with 50 ml. of 1 N aqueous sodium hydroxide, followed by extraction with two 20 ml. portions of ethyl acetate. The aqueous solution was cooled and acidified. The white solid precipitate was filtered off, washed with ice water and dried to give 2.0 g. (70 percent) of pure material, m.p. 101°–103°. An analytical sample, m.p. 104°–105°, was obtained by one recrystallization from n-hexane.

3-Bromomethyl-2-phenylisocrotonic Ester

A mixture of methyl 3-methyl-2-phenylcrotonate (20.5 g., 0.11 mole), N-bromosuccinimide (19.5 g., 0.11 mole), benzoyl peroxide (0.25 g.) and carbon tetrachloride (250 ml.) was heated under reflux for 1 hour. After cooling a quantitative amount of succinimide was filtered off. The solvent was removed from the filtrate and the residue was distilled *in vacuo* to give 11.0 g. (37 percent) of methyl 3-bromomethyl-2-phenylisocrotonate 1, b.p. 107°–112° C. (0.8 mm.). A second distillation fraction, b.p. 134°–152° C. (0.7 mm.), amounting to 8.4 g. solidified upon cooling and was recrystallized from a 1:1 mixture of benzene and n-hexane to give 3.1 g. of white plates, m.p. 82°–85° C., believed to be the lactone 2. The n.m.r. spectrum (in CCl$_4$) of the main product consisted of singlets at $\tau$2.72, 6.25, 6.38 and 7.84 with an integrated area ratio of 5:2:3:3 respectively. The n.m.r. spectrum (in CDCL$_3$) of the solid distillation product consisted of singlets at $\tau$2.54, 5.24 and 7.84 with an integrated area ratio of 5:2:3 respectively. An investigation of the n.m.r. spectrum of the product mixture prior to distillation indicated that the actual yield of the desired product was approximately 60 percent and that no lactone was present. During the distillation it was obvious that decomposition took place as in the first stages of the distillation a vacuum of no better than approximately 5 mm. Hg could be obtained. The bromomethyl compound once distilled could be redistilled without any decomposition.

t-Butyl 3-bromomethyl-2-phenylisocrotonate was similarly prepared by an N-bromosuccinimide bromination of t-butyl 3-methyl-2-phenylcrotonate (1.5 h reflux). As in the case of the methyl ester the crude product was obtained in theoretical yield. The product however could not be purified by distillation *in vacuo* as this resulted in complete decomposition.

3-Bromomethyl-2-arylisocrotonic esters and 2-aryl-3-hydroxymethyl-crotonic acid lactones.

General procedure

A mixture of 2-aryl-3-methylcrotonic ester (0.10 mole), N-bromosuccinimide (17.8 g., 0.10 mole), benzoyl peroxide (0.2–0.4 g.) and carbon tetrachloride (250 ml.) was heated under reflux for 1 hour. After cooling, a quantitative amount of succinimide was filtered off. The solvent was removed from the filtrate leaving a residue which, according to the n.m.r. spectrum (table V), primarily consisted of the two isomeric monobromo compounds but also contained small amounts of the dibromo compounds and starting material. The residue was slowly heated *in vacuo*. At approximately 100°–120° a decomposition took place as was evident by the increase of pressure. When the decomposition was complete the bath temperature was raised further and 3-bromomethyl-2-arylisocrotonic ester was distilled. A higher boiling distillation fraction consisted of 2-aryl-3-hydroxymethylcrotonic acid lactone. The lactone solidified upon cooling; it was washed with cold n-hexane and then recrystallized from carbon tetrachloride. Tabels VI and VII list the various bromo esters and lacetones prepared and include the yields and physical constants.

In the preparation of ethyl 3-bromomethyl-2-(3,4-dichlorophenyl)isocrotonate the lacetone was separated from the bromo ester prior to distillation by the addition of n-hexane. This experiment is given in detail below.

Ethyl 3-bromomethyl-2-(3,4-dichlorophenyl) isocrotonate and 2-(3',4'-dichlorophenyl)-3-hydroxymethylcrotonic acid lactone.

A mixture of ethyl 2-(3',4'-dichlorophenyl)-3-methylcrotonate (60.0 g., 0.22 mole), N-bromosuccinimide (39.1 g., 0.22 mole), benzoyl peroxide (0.8 g.) and carbon tetrachloride (600 ml.) was heated under reflux for 1 hour. The succinimide was filtered off and the solvent was removed from the filtrate leaving 84 g. of the isomer mixture as residue, the n.m.r. characteristics of which are given in table V. The crude product mixture was heated under vacuum at approximately 120° for 1 hour, during which time the pressure increased to 3 mm; then decreased again to its original value of 0.3 mm. The mixture was cooled solid precipitate formed) and N-hexane was added. The yellow colored lactone (14.0 g., 27 percent, m.p. 119°–122°) was filtered off and recrystallized from carbon tetrachloride to give 10.9 g. of pale yellow solid (an analytical sample was white) m.p. 125°–127°. The infrared spectrum (nujol mull) contained a band at 1740 cm.$^{-1}$ (with a shoulder at 1750 cm.$^{-1}$) ascribed to the carbonyl group. The n.m.r. spectrum (in CDCl$_3$) contained a multiplet at $\tau$2.3–2.8 and singlets at $\tau$5.22 and 7.79 with an integrated area ratio of 3:2:3 respectively. Details are given in table VII. The hexane was removed from the filtrate and the residue fractionally distilled to give 35.6 g. (46 percent) of ethyl 3- bormomethyl-2-(3',4'-dichlorophenyl) isocrotonate as a pale yellow oil, b.p. 135°-150° (0.5-0.8 mm.). The infrared spectrum of the neat liquid contained a carbonyl band at 1720 cm.$^{-1}$. The n.m.r. spectrum (in CCl$_4$) consisted of a multiplet at τ2.4-3.0, a methylene quartet at τ5.84, a methylene singlet at τ6.24, a methyl singlet at τ7.81 and a methyl tiplet at τ8.77.

Hydrolysis of Methyl 3-bromomethyl-2-phenylcrotonate

A mixture of methyl 3-bromomethyl-2-phenylcrotonate (5.2 g., 0.020 mole), acetic acid (50 ml.) and 6 N hydrochloric acid (25 ml.) was heated under reflux for 6 hours. The mixture was concentrated to dryness under reduced pressure and water was added to the residue. The organic material was taken up in ether and the acidic product was then extracted from the ether solution with a 2 N aqueous sodium carbonate solution. The ether solution was dried (MgSO$_4$) and the ether removed, giving 1.8 g. of residue which partially solidified. The solid was isolated by the addition of n-hexane followed by filtration: 0.5 g., m.p. 77°-82° C. (m.p. 84°-86° C. after recrystallization from a 1:1 benzene-n-hexane mixture), νmax (Nujol) 1750 cm.$^{-1}$. The material was identical in all respects with the lactone 5 obtained previously. The n-hexane was removed from the filtrate leaving 1.3 g. of an oil with an infrared spectrum identical to that of the starting ester.

The carbonate extract was cooled and acidified. The acidic products were extracted with ether. The ether solution was dried and the ether removed leaving 2.2 g. of an oil. The addition of a 1:1 benzene-n-hexane mixture followed by cooling resulted in a solid precipitate: 0.5 g., m.p. 125°-128° C. The solid was recrystallized to give 0.45 of a white solid, m.p. 130°-132° C. The melting point was not depressed by the addition of 3-hydroxymethyl-2-phenylcrotonic acid, prepared according to scheme 2.

3-Azidomethyl-2-arylisocrotonic acids (General procedure)

A mixture consisting of 3-bromomethyl-2-arylisocrotonic ester (0.050mole), sodium azide (3.6 g., 0.055 mole), water (10 ml.) and acetone (90 ml.) was stirred at room temperature for 3 hours. The solvent was removed and water (25 ml.) and ether (50 ml.) were added to the residue. The ether solution was dried and the ether removed, leaving the quantitative amount of 3-azidomethyl-2-arylisocrotonic ester. The esters were hydrolysed by heating under reflux with a mixture of acetic acid (100 ml.) and 6 N hydrochloric acid (50-75 ml.) for 2-6 hours. The mixture was concentrated to dryness and water (25 ml.) and ether (100 ml.) added to the residue. The acidic material was extracted from the ether solution with 2 N aqueous sodium carbonate followed by acidification of the carbonate extract to give the crude azido acid which was isolated by extraction with ether. The recovered neutral material consisted mainly of starting material and was generally subjected again to the same hydrolysis procedure. The combined crops of crude azido acids were purified by chromatography on a silica gel column. The azido acids were eluted with a 10 percent solution of ether in benzene. Some of the azido acids purified in this manner still failed to crystallize (probably because of the presence of some of the other isomer, formed in the hydrolysis, which could not be removed by silica gel chromatography) but could be used to prepare the azido penicillins. More information on the azido acids and the hydrolysis conditions is given in table VIII. As an example the preparation of 3-azidomethyl-2-(3',4'-dichlorophenyl)-isocrotonic acid is given below.

3-Azidomethyl-2-(3',4'-dichlorophenyl)isocrotonic acid

A mixture consisting of ethyl 3-bromomethyl-2-(3',4'-dichlorophenyl isocrotonate (46.2 g., 0.131 mole), sodium azide (9.4 g., 0.144 mole), water (30 ml.) and acetone (270 ml.) was stirred at room temperature for 3 hours. The acetone was removed and water (50 ml.) and ether (100 ml.) were added to the residue. The ether solution was dried (MgSO$_4$) and the ether removed giving 40.7 g. (99 percent) of the ethyl 3-azidomethyl-2-(3',4'-dichlorophenyl)isocrotonate as a pale yellow oil. The infrared spectrum of the neat liquid contained strong bands at 2095 and 1720 cm.$^{-1}$ ascribed to the azide and carboxyl group respectively. The n.m.r. spectrum (in CCl$_4$) was also in agreement with the assigned structure and contained the allylic methyl and methylene singlets at τ7.86 and 6.33 respectively. The ester (40.7 g., 0.13 mole) was heated under reflux for 6 hours with a mixture of 400 ml. acetic acid and 200 ml. 6 N hydrochloric acid. The mixture was concentrated to dryness under reduced pressure and water (50 ml.) and ether (200 ml.) added to the residue. The ether solution was extracted with 2 N aqueous sodium carbonate, until the extract was alkaline. The carbonate extract was cooled and acidified with 6 N hydrochloric acid, followed by extraction of the oil with ether. The ether extract was dried and the ether removed leaving 20 g. of acidic residue, which was purified by chromatography on silica gel. The desired acid was eluted with a 10 percent solution of ether in benzene. The appropriate fractions were combined giving 14.0 g. of oily acidic material which according to the n.m.r. spectrum (in CDCl$_3$) consisted of 3-azidomethyl-2-(3',4'-dichlorophenyl)isocrotonic acid (65 percent; the allylic methyl and methylene groups appeared at τ7.74 and 6.32 respectively), 3-azidomethyl-2-(3',4'-dichlorophenyl)crotonic acid (25 percent; the allylic methyl and methylene groups appeared at τ8.21 and 5.64 respectively) and 2-(3',4'-dichlorophenyl)-3-methylcrotonic acid (10percent). The chromatography did not effect any isomer separation as the same ratio of products was present in the material prior to chromatography. The product thus obtained was used for the preparation of the azido penicillin without any further purification (it appears that the azidocrotonic acid does not survive the reaction conditions for preparing the acid chloride).

3-Azidomethyl-2-phenylisocrotonic Acid a. from methyl 3-bromomethyl-2-phenylcrotonate:

A mixture of the bromo ester (10.8 g., 0.040 mole), sodium azide (2.9 g., 0.045 mole) and 100 ml. of acetone containing 10 percent of water was stirred at room temperature for 16 hours. Most of the acetone was removed under reduced pressure and water (25ml.) and ether (75ml.) were added to the residue. The ether layer was dried (MgSO$_4$) and the ether removed leaving 9.4 g. (101 percent) of pale yellow liquid residue; νmax (neat) 2100 and 1720 cm.$^{-1}$. A mixture of the azido ester (9.4 g., 0.040 mole), acetic acid (100 ml.) and 6 N hydrochloric acid (75 ml.) was heated under reflux for 2.5 hours, whereafter most of the solvents were removed under reduced pressure. The residue was treated with ether (100 ml.) and water (50 ml.) and the ether solution was subsequently extracted with 3 N aqueous sodium carbonate. From the ether layer 3.4 g. of unreacted starting azido ester was recovered. From the carbonate extract, after acidification and extraction with ether, was obtained 1.8 g. (32 percent, based on unrecovered starting material) of off-white solid m.p. 93°-98° C. An analytical sample m.p. 103°-105° C., was obtained by three recrystallizations from n-hexane; n.m.r. spectrum (CDCl$_3$): τ-1.63 (CO$_2$ H), 2.5-2.9 (phenyl), 6.33 (CH$_2$) and 7.77 (CH$_3$); νmax (Nujol) 2090 (doublet) and 1680 cm.$^{-1}$; neutralization equivalent, 208 (calcd., 217). The melting point was undepressed by a pure sample of the material prepared by scheme 2.

b. from t-butyl 3-bromomethyl-2-phenylcrotonate:

A mixture of the crude bromo ester (35 g., 0.113 mole), sodium azide (9.3 g., 0.14 mole) and 250 ml. of acetone containing 10 percent of water was stirred at room temperature for 3 hours, followed by the usual work-up to give 31 g. of crude azido ester. A mixture of the azido ester (31 g., 0.11 mole), acetic acid (200 ml.) and 6 N hydrochloric acid (100 ml.) was heated under reflux for 15 min., whereafter the mixing was concentrated under reduced pressure to half its volume, followed by the addition of 400 ml. of ice water. The brownish colored solid precipitate was filtered off and washed with ice water. The crude acid was dissolved in ether and extracted with three 25 ml. portions of 2 N aqueous sodium carbonate. The carbonate extract was cooled, acidified and the product taken up in ether. The residue obtained after drying and removal of the ether was treated with n-hexane and filtered to give 11.4 g. (46 percent) of pale yellow solid, m.p.

58°–66 C. The acid was very difficult to purify by recrystallization from n-hexane, but could be used as such in the preparation of the penicillin.

When either the T-butyl ester or methyl ester of 3-bromomethyl-2-phenylisocrotonic acid was treated with sodium azide in aqueous acetone, an 3-azidomethyl-2-phenylisocrotonic ester was produced which could be hydrolyzed to 3-azidomethyl-2-phenylisocrotonic acid 7.

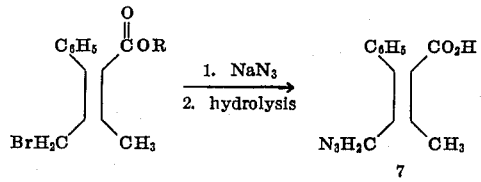

A second synthetic scheme was devised to produce 3-azidomethyl-2-phenylisoisocrotonic acid 17. Scheme 2 illustrates the sequence of reactions that were carried out starting from α-methylcinnamic acid 8. The tetrahydropyranyl ether 12 was employed in the lithiation step to prevent isomerization. When the hydroxy compound 11 was lithiated directly, followed by carbonation and acidification, the lactone 2 was

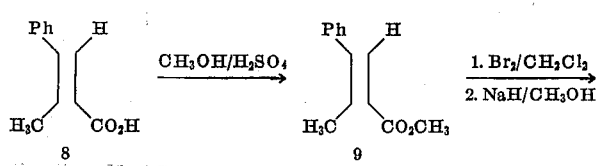

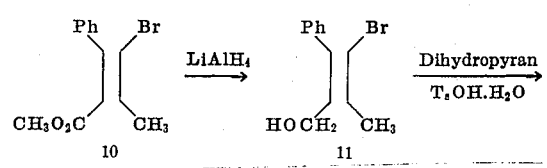

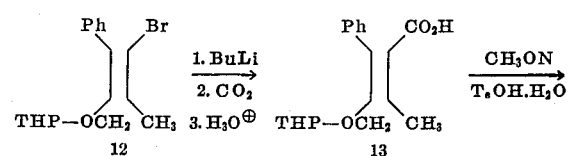

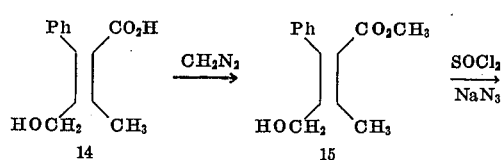

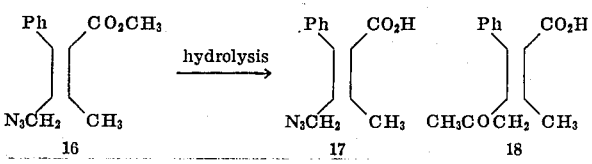

SCHEME 2 produced almost exclusively. The acetoxy compound 18 was obtained from 14 by reaction with acetic anhydride and pyridine. The azido acid obtained from scheme 2 was identical with the azido acid prepared previously from the bromo ester 1.

α-Methylcinnamic acid 8

The title compound was prepared from benzaldehyde, propionic anhydride and sodium propionate according to the procedure described in Organic Reactions, Vol. I, p. 251.

Methyl α-methylcinnamate 9

α-Methylcinnamic acid (239 g., 1.48 mole), concentrated sulfuric acid (16 ml.) and methanol (1000 ml.) was refluxed for 4 hours. The reaction mixture was concentrated and the residue dissolved in ethyl acetate (ca. 300 ml.). The ethyl acetate solution was washed successively with 1 N NaOH, water and saturated aqueous sodium chloride, then dried (MgSO$_4$) and concentrated to give a low melting solid, 235 g. (90 percent), m.p. 37°–38° C.

Methyl α-methyl-β-bromo-iso-cinnamate 10

Methyl α-methylcinnamate (300 g., 1.7 mole) in methylene chloride (300 ml.) was treated at 25°–30° C. with bromine (287 g., 1.8 mole) and the mixture stirred for 2 hours longer. The reaction mixture was concentrated, dry benzene added and concentrated three times.

The crude dibromo compound in benzene (300 ml.) was slurried with sodium hydride (56 percent in oil, hexane, washed, 80 g., 1.9 mole) and methanol was added at such a rate that the evolution of gas was not too rapid. After further addition of methanol did not cause a brisk evolution of gas, the mixture was heated on a boiling water-bath until the reaction was complete. Water was then added, the layers separated, and the aqueous portion further extracted with ether. The combined organic portions were dried (MgSO$_4$) and concentrated, and the residue was fractionated through a Vigreux column. The main fraction (291 g., 67 percent) had b.p. 106°–111° (1.0 mm). Ymax (film): 1710, 1260 and 1120 cm.$^{-1}$ ; n.m.r. (CCl$_4$): τ2.70 (s,5H), 6.67 (s, 3H) and 7.80 (s, 3H); g.l.c. and n.m.r. indicated 85–90 percent purity.

α-Methyl-β-bromo-iso-cinnamyl alcohol 11

To a slurry of lithium aluminum hydride (17.1 g., 0.45 mole) in dry ether (200 ml.) at 0° C. an ethereal solution of methyl α-methyl-β-bromo-cinnamate (114.8 g., 0.45 mole) was added at such a rate that the temperature remained between 0°–5° C. After the addition was complete, the mixture was stirred at the same temperature for 1 hour, then excess hydride was decomposed by careful addition of water. The gelatinous hydroxides were partially dissolved by addition of 6 N sulfuric acid, and the ether layer separated. The aqueous portion was further extracted with ether and the combined ether portions were dried and concentrated. Distillation of the residue (210 g., from two reactions) gave a colorless liquid, 180 g., b.p. 118°–122°(1.5 mm.). Yield 88 percent (n.m.r. indicated ca. 70 percent purity); n.m.r. (CCl$_4$): τ2.8 (s, 5H), 6.16 (s, 2H), 6.60 (s, 1H) and 7.98 (s, 3H).

THP ether of (11)

To a solution of the alcohol (137.4 g., 0.6 mole) in freshly distilled dihydropyran (94 g., 1.12 mole) at 0° C., a few crystals of p-toluenesulfonic acid monohydrate were added. The mixture was stirred for 0.5 hour at the same temperature, and at 20° C. for 1 hour, then concentrated in vacuo. The residue was dissolved in either, and the solution was washed with a 10 percent aqueous sodium bicarbonate solution, water and saturated aqueous sodium chloride. Drying (MgSO₄) and concentration gave a colorless liquid in quantitative yield. (Attempts to distill the ether resulted in decomposition and the alcohol was regenerated).

2-Phenyl-3-hydroxymethyl THP ether-iso-crotonic acid (12)

The crude bromo-THP ether (12) [6.22 g., 0.02 mole] in dry tetrahydrofuran (100 ml.) was cooled to −70°, and treated dropwise with a 1.6 M solution of n-butyllithium in hexane (13.8 ml., 0.022 mole) at a rate such that the temperature did not rise above −65° C. The orange solution was stirred for another hour at the same temperature, then added to a large excess of powdered carbon dioxide and the mixture allowed to stand at 20° C. overnight.

The mixture was concentrated, and the residue partitioned between ether and water.

The aqueous portion was cooled in an ice water bath, covered with ether and the mixture stirring while being acidified with 6 N hydrochloric acid to pH ca. 1. The layers were separated, and the aqueous portion was further extracted with ether. The combined ether extracts were dried (MgSO₄) and concentrated to give a viscous liquid (1.6 g.) which solidified upon cooling. The residue was washed with cold hexane to give 0.9 g. (20 percent) of white solid, m.p. 100°–102° C., ν max (Nujol): 2600, 1680 and 1630 cm.⁻¹; n.m.r. (CDCl₃): τ−1.5, (s, 1H), 2.75 (m, 5H), 5,56 (m, 1H), 6.1 (q, 2H); J=20 and 14 c.p.s.), 6.2–6.7 (m, 2H), and 8.42 (m, 6H).

Ether portion: After drying and concentration the ether portion yielded 4.0 g. of an oil.

Larger scale reactions gave less pure material, which was used in the next stage without further purification.

2-Phenyl-3-hydroxymethyl-iso-crotonic acid (14)

The crude mixture of THP acids (2.8 g., 0.01 mole) and p-toluenesulfonic acid monohydrate (0.10 g.) in methanol (40 ml.) were heated under reflux for 8 hours. The mixture was concentrated and a solution of the residue in ethyl acetate (100 ml.) was extracted thoroughly with 7.5 percent aqueous sodium bicarbonate solution.

Ethyl acetate portion: after drying and concentration, the neutral portion gave material, 0.4 g., whose infrared spectrum indicated that it was a lactone.

Sodium bicarbonate portion: the alkaline solution was cooled, acidified with 6 N sulfuric acid, and the precipitated solid extracted with ethyl acetate (3×25 ml.). Drying and concentration gave material, 1.5 g. m.p. 126°–129° C., ν max (Nujol): 3200, 2500, 1950 and 1670 cm.⁻¹; n.m.r. (acetone d₆): τ2.65 (s, 5H), 4.75 (broad s, 2H), 6.01 (s, 2H), and 7.85 (s, 3H). An analytical sample had m.p. 134°–135° C., and neutralization equivalent, 192 (calcd., 192).

2-Phenyl-3-acetoxymethyl-iso-crotonic acid (18)

The hydroxy-acid (14) (4.0 g., 0.021 mole), acetic anhydride (8 ml.), and pyridine (10 ml.) were allowed to stand at room temperature overnight. The mixture was added to an ice water mixture (20 g.) and after no oily drops remained, the clear solution was cooled and acidified with 3 N hydrochloric acid. Filtration gave the crude acetoxy acid (4.7 g., 95 percent). Crystallization from ethyl acetate-hexane gave 3 g. of pure acid, m.p. 110°–111° C.; neutralization equivalent 232 (calcd. 234); ν max (Nujol): 2600, 1740, 1670, 1620, 1210, and 1012 cm.⁻¹; n.m.r. (CDCl₃): τ−1.77 (s, 1H), 2.65 (m, 5H), 5.52 (x, 2H), 7.85 (s, 3H) and 7.98 (s, 3H).

2-Phenyl-3-azidomethyl-iso-crotonic acid (17)

The hydroxy-acid (14) (9.4 g., 0.049 mole) in methanol (10 ml.) at 0° C. was treated portion wise with a cold ethereal solution of diazomethane until the yellow color of the reagent persisted for 0.5 hour. Concentration gave a quantitative yield of the methyl ester (15) ν max (film): 3400, 1720, 1210 and 1010 cm.⁻¹; n.m.r. (CDCl₃): τ2.76 (m, 5H), 6.0 (s, 2H), 6.30 (s, 3H), 7.87 (s, 3H) and 7.95 (s, 1H).

The hydroxymethyl methyl ester (15) (10 g., 0.049 mole) was cooled to 0° C., treated with cold thionyl chloride (30ml.), (there was immediate and vigorous evolution of gases) and the solution set aside at 0° overnight. The mixture was concentrated, benzene added and concentrated three times giving the chloromethyl methyl ester in quantative yield. νmax (film): 1730, 1220, and 1060 cm.⁻¹; n.m.r. (CDCl₃): τ2.6 (m, 5H), 6.10 (x, 2H), 6.29 (s, 3H) and 7.85 (s, 3H).

The chloromethyl methyl ester (11.1 g., 0.049 mole) in acetone (160 ml.) and sodium azide (3.9 g., 0.06 mole) in water (16 ml.) were stirred for 23 hours. The mixture was concentrated, the residue dissolved in ethylacetate (100 ml. ) and the solution washed with water (2×100 ml.). The combined ethyl acetate portions, after drying and concentration, gave a yellow oil, 11.15 g. (99 percent), νmax (film): 2100, 1720, 1210 and 1060 cm.⁻¹ ; n.m.r. (CDCl₃): τ2.65 (m, 5H), 6.30 (s, 5H), and 7.85 (s, 3H).

The crude azidomethyl methyl ester (16)(12.1 g., 0.052 mole), acetic acid (100 ml.), and 6 N hydrochloric acid (75 ml.) were refluxed for 6 hours. The reaction mixture was concentrated, diluted with water, and twice extracted with ethyl acetate. The combined ethyl acetate portions were extracted with 10 percent aqueous sodium bicarbonate solution, yielding acidic and neutral portions.

Neutral Portion

After drying and concentration there was obtained and oil (3.5 g.) which proved to be crude starting material.

Acidic Portion

The alkaline solution was acidified with 6 N sulfuric acid, then extracted with ethyl acetate (2×75 ml.). The combined ethyl acetate portions after washing with water and drying (MgSO₄ were concentrated to give the azido methyl carboxylic acid (17), 4 g. (35 percent overall, 50 percent based on unrecovered material). Crystallization from hexane gave microneedles, 2.7 g., m.p. 76°–83° C. νmax (Nujol): 2600, 2100, 1680 and 1620 cm.⁻¹ ; n.m.r. (CDCl₃): τ−1.12 (s, 1H), 2.6 (m, 5H), 6.28 (s, 2H) and 7.75 (s, 3H). The infrared spectra were superimposable with those of the azido acid obtained previously via 3-bromomethyl-2-phenylisocrotonic ester; mixture m.p. 92°–96° C.

TABLE I-A 3-aryl-2,2-dimethyl-3-hydroxypropanoic esters

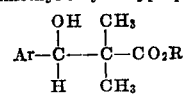

| Ar | R | B.P., °C. (mm. Hg) and/or M.P., °C. | Yield, percent |
|---|---|---|---|
| C₆H₅ | CH₃ | 103–104 (0.3) M.P. 66–69 | 80 |
| C₆H₅ | C₂H₅ | 105–110 (0.3) M.P. 40–42 | 82 |
| o-ClC₆H₄ | CH₃ | 114–118 (0.2) | 72 |
| p-ClC₆H₄ | C₂H₅ | 128–129 (0.5) | 77 |
| 2,4-Cl₂C₆H₃ | CH₃ | M.P. 77–79 | 79 |
| 3,4-Cl₂C₆H₃ | C₂H₅ | M.P. 68–70 | 48 |
| 2,6-Cl₂C₆H₃ | CH₃ | 140–145 (0.7) | 68 |
| o-FC₆H₄ | C₂H₅ | 81–85 (0.05) | 81 |
| 3-thienyl | C₂H₅ | 109–110 (0.5) | 75 |

TABLE I-B

Arylglyoxylic esters prepared from aroyl cyanides

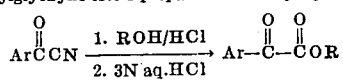

| | | Aroyl cyanide | | | |
|---|---|---|---|---|---|
| Ar | R | M.P. or B.P. (mm. Hg),° C. | Yield, percent | Yield, percent | B.P. (mm. Hg),° C. |
| C₆H₅ | CH₃ | 90–92 (12) | 90 | 54 | 80–81 (0.1) |
| p-ClC₆H₄ | C₂H₅ | 63–68 (0.6) | 81 | 87 | 90–96 (0.4) |
| o-ClC₆H₄ | CH₃ | 120 (~10) | 90 | 42 | 106–115 (1–1.5) |
| m-ClC₆H₄ | CH₃ | 118–120 (~10) | 84 | 69 | M.P. 45–46 |
| 2,4-Cl₂C₆H₃ | C₂H₅ | 75–82 | 54 | 48 | 106–110 (0.4) |
| 3,4-Cl₂C₆H₃ | C₂H₅ | 68–70 | 84 | 92 | 110–112 (0.5) |
| p-CH₃C₆H₄ | CH₃ | 118–120 (18) | 48 | 62 | 90–94 (0.4) |
| o-CH₃C₆H₄ | CH₃ | 101–105 (~10) | 91 | 36 | 110–104 (~10) |

TABLE I-C

Arylglyoxylic esters prepared by a Friedel-Craft reaction $$ArH + ROOC-CCl \xrightarrow[-HCl]{AlCl_3} Ar-C(O)-C(O)OR$$

| Ar | R | B.P. (mm. Hg) or M.P., °C. | Yield, percent |
|---|---|---|---|
| $C_6H_5$ | $CH_3$ | 98-102 (2.3) | 58 |
| $C_6H_5$ | $C_2H_5$ | 95-99 (1.5) | 30 |
| p-$CH_3OC_6H_4$ | $CH_3$ | 111-117 (0.7) 46-48 | a 60, 33 |
| 2-thienyl | $CH_3$ | 90-92 (0.9) | 53 |
| 5-chloro-2-thienyl | $C_2H_5$ | 110-112 (1.0) 40-45 | 78 |
| 2,5-dichloro-3-thienyl | $CH_3$ | 58-60 | 78 |
| Do | $C_2H_5$ | 110 (0.8) | 82 |
| 3-methyl-2-thienyl | $CH_3$ | 94-95 (0.5) | b 66 |
| 2,5-dimethyl-3-thienyl | $CH_3$ | 93-97 (0.5) | 70 | a A 60% yield of the distilled product was obtained as a pale yellow liquid which could be crystallized to white needles from a n-hexane solution. Although the liquid and the solid had identical n.m.r. spectra, the solid was obtained in only 33% yield due to the product's solubility in n-hexane.
b No trace of the other possible isomer, ethyl 4-methyl-2-thienylglyoxalate, was formed in the reaction as was indicated by the n.m.r. spectrum of the crude product.

TABLE II

Arylglyoxylic esters

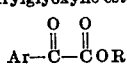

| Ar | R | B.P., °C. (mm. Hg) | Yield, percent |
|---|---|---|---|
| $C_6H_5$ | t-$C_4H_9$ | 86-93(0.5-0.8) | 70 |
| p-$ClC_6H_4$ | $C_2H_5$ | 90-96(0.4) | 75 |
| 2,4-$Cl_2C_6H_3$ | $C_2H_5$ | 104-106(0.3) | 43 |
| 2-thienyl | $CH_3$ | 90-93(0.3) | 84 |
| 3,5-dibromo-2-thienyl | $C_2H_5$ | 135-137(0.5) | 75 |
| 1-naphthyl | $C_2H_5$ | 154-155(0.5) | 80 |
| 2-thiazolyl | $C_2H_5$ | 88.90(0.4) | 72 |

TABLE III 2-aryl-3-methylcrotonic esters

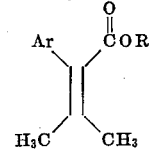

| Ar | R | B.P., °C. (mm. Hg.) | Yield, percent By Wittig reaction | Yield, percent By $P_2O_5$ rearrangement |
|---|---|---|---|---|
| $C_6H_5$ | $CH_3$ | 70-72(0.4) | 72 | 36 |
| $C_6H_5$ | $C_2H_5$ | 73-75(0.4) | | 25 |
| $C_6H_5$ | t-$C_4H_9$ | 73-75(0.1) | 73 | |
| o-$ClC_6H_4$ | $CH_3$ | 83-88(0.5) | | 28 |
| p-$ClC_6H_4$ | $C_2H_5$ | 118-119(2.0) | 72 | 48 |
| 2,4-$Cl_2C_6H_3$ | $CH_3$ | 99-101(0.1) | | 41 |
| 2,4-$Cl_2C_6H_3$ | $C_2H_5$ | 100-105(0.5) | 55 | |
| 2,6-$Cl_2C_6H_3$ | $CH_3$ | a M.P. 121-124 | | 17 |
| 3,4-$Cl_2C_6H_3$ | $C_2H_5$ | 115-118(0.5) | | 52 |
| o-$FC_6H_4$ | $C_2H_5$ | 80-83(0.7) | | 43 |
| 2-thienyl | $CH_3$ | 74-78(0.1) | 40 | |
| 3,5-dibromo-2-thienyl | $C_2H_5$ | 115-120(1.0) | 19 | |
| 1-naphthyl | $C_2H_5$ | 133-134(0.5) | 40 | |
| 2-thiazolyl | $C_2H_5$ | 94-95(0.5) | 50 | |
| 5-isothiazolyl | $C_2H_5$ | 76-78(0.1) | 10 | |
| o-$ClC_6H_4$ | $CH_3$ | 84-93(1.7) | 52 | |
| m-$ClC_6H_4$ | $CH_3$ | 91-92(0.7) | 60 | |
| 3,4-$Cl_2C_6H_3$ | $C_2H_5$ | 110-115(0.3) | 58 | |
| p-$CH_3C_6H_4$ | $CH_3$ | 80-82(0.1) | 74 | |
| o-$CH_3C_6H_4$ | $CH_3$ | 83-85(0.5) | 42 | |
| p-$CH_3OC_6H_4$ | $CH_3$ | 106-112(0.4) | 81 | |
| 5-chloro-2-thienyl | $C_2H_5$ | 118-119(2.5) | 59 | |
| 2,5-dichloro-3-thienyl | $C_2H_5$ | 94-95(0.4) | 57 | | a Isolated by the addition of n-hexane to the distillate followed by cooling.

TABLE IV 3-methyl-2-arylcrotonic acids prepared by acid hydrolysis of esters

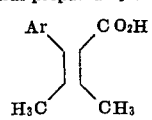

| Ar | M.P., °C. (recr. solvent) | Hydrol. conditions (hr. of reflux in 6 N hydrochloric acid-acetic acid) | Yield, percent | N.m.r., chemical shifts a (T) of $CH_3$ groups |
|---|---|---|---|---|
| $C_6H_5$ | 150-153 ($C_6H_6$-n-$C_6H_{14}$) | b 16 | b 33 | 7.79, 8.32 |
| o-$ClC_6H_4$ | 136-138 ($C_6H_6$-n-$C_6H_{14}$) | 16 | 48 | 7.68, 8.35 |
| p-$ClC_6H_4$ | 143-144 ($C_6H_6$-n-$C_6H_{14}$) | 16 | 47 | 7.77, 8.32 |
| 2,4-$Cl_2C_6H_3$ | 133-135 (n-$C_6H_{14}$) | 16 | 24 | 7.74, 8.28 |
| 3,4-$Cl_2C_6H_3$ | 133-134 (n-$C_6H_{14}$) | 16 | 39 | 7.75, 8.29 |
| 2,6-$Cl_2C_6H_3$ | 175-178 (n-$C_6H_{14}$) | 30 | 61 | 7.60, 8.33 |
| o-$FC_6H_4$ | 148-149 ($C_6H_6$-n-$C_6H_{14}$) | 16 | 60 | 7.68, 8.26 |
| 2-thienyl | 126-128 (n-$C_6H_{14}$) | 4.5 | 69 | 7.77, 8.15 |
| 3,5-dibromo-2-thienyl | 131-132 (n-$C_6H_{14}$) | 24 | 23 | 7.66, 8.14 |
| 1-naphthyl | 187-188 ($C_6H_6$-n-$C_6H_{14}$) | 16 | 79 | 7.69, 8.49 |
| m-$ClC_6H_4$ | 105-106 (n-$C_6H_{14}$) | 16 | 62 | 7.77, 8.31 |
| p-$CH_3C_6H_4$ | 139-140 ($C_6H_6$-n-$C_6H_{14}$) | 16 | 54 | 7.67, 7.82, 8.32 |
| o-$CH_3C_6H_4$ | 104-105 (n-$C_6H_{14}$) | 16 | 71 | 7.73, 7.82, 8.40 |
| p-$CH_3OC_6H_4$ | 123-125 (n-$C_6H_{14}$) | 17 | 50 | 7.82, 8.31 |
| 5-chloro-2-thienyl | 144-146 (n-$C_6H_{14}$) | 16 | 40 | 7.78, 8.13 |
| 2,5-dichloro-3-thienyl | 137-139 (n-$C_6H_{14}$) | 16 | 56 | 7.72, 8.21 | a The spectra were taken on $CDCl_3$ solutions.
b The t-butyl ester could be hydrolysed by 1 hour reflux in a mixture of trifluoroacetic acid and benzene; yield 70%.

TABLE V

N.m.r. chemical shifts and isomer ratios of NBS-bromination products of 2-aryl-3-methylcrotonic esters.

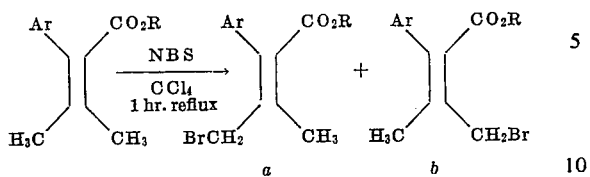

| | | Chemical shifts (τ)[a] | | | | |
|---|---|---|---|---|---|---|
| | | a | | b | | |
| Ar | R | CH₃ | CH₂ | CH₃ | CH₂ | Ratio, a/b |
| C₆H₅ | CH₃ | 7.83 | 6.24 | 8.20 | 5.60 | 2.7 |
| p-ClC₆H₄ | C₂H₅ | 7.85 | 6.26 | 8.21 | 5.65 | 1.7 |
| o-ClC₆H₄ | CH₃ | 7.65 | 6.35 | 8.25 | 5.38 | 1.3 |
| p-CH₃C₆H₄[b] | CH₃ | 7.86 | 6.24 | 8.21 | 5.65 | 1.8 |
| 3,4-Cl₂C₆H₃ | C₂H₅ | 7.81 | 6.24 | 8.16 | 5.62 | 1.5 |
| 5-chloro-2-thienyl | C₂H₅ | 7.87 | 6.03 | 7.98 | 5.74 | 1.7 |

[a] Solvent: CCl₄.
[b] The aryl methyl group absorbs at τ7.66. From the n.m.r. spectrum it appears that very little bromination has taken place at this position

TABLE VI 3-bromomethyl-2-arylisocrotonic esters

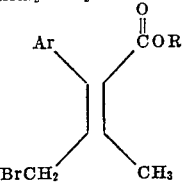

| Ar | R | Yield, percent | B.P., °C. (mm. Hg) | N.m.r. chemical shifts (τ)[a] | |
|---|---|---|---|---|---|
| | | | | CH₃ | CH₂ |
| C₆H₅ | CH₃ | 37 | 107–112 (0.8) | 7.84 | 6.25 |
| p-ClC₆H₄ | C₂H₅ | 43 | 125–127 (0.4) | 7.87 | 6.28 |
| o-ClC₆H₄ | CH₃ | 28 | 123–126 (0.8) | 7.65 | 6.35 |
| 2,4-Cl₂C₆H₃ | C₂H₅ | 45 | 130–150 (0.4) | 7.66 | 6.36 |
| 3,4-Cl₂C₆H₃ | C₂H₅ | 46 | 135–150 (0.5–0.8) | 7.82 | 6.27 |
| p-CH₃C₆H₄ | CH₃ | 35 | 128–130 (1.2) | 7.67; 7.87 | 6.24 |

[a] Solvent: carbon tetrachloride.

TABLE VII 2-aryl-3-hydroxymethylcrotonic acid lactones

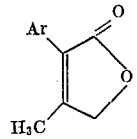

| Ar | Yield, percent | B.P. (mm. Hg) (M.P.), °C. | N.m.r. chemical shifts (τ)[a] | |
|---|---|---|---|---|
| | | | CH₃ | CH₂ |
| C₆H₅ | 16 | 134–152 (0.7)()84–86 | 7.84 | 5.24 |
| p-ClC₆H₄ | 25 | 164–166(0.4) (85–87) | 7.84 | 5.26 |
| o-ClC₆H₄ | 21 | 167–714(1.5)(111.5–112.5) | 7.99 | 5.18 |
| 2,4-Cl₂C₆H₃ | 22 | 150–175(0.4) (103–105) | 7.97 | 5.17 |
| 3,4-Cl₂C₆H₃ | 27 | 150–190(0.8–1.5) (125–127) | 7.79 | 5.22 |
| p-CH₃C₆H₄ | 12 | 149–154(1.5) (95–96) | 7.64; 7.84 | 5.30 |
| 5-chloro-2-thienyl | 24 | 170–174(0.5) (75–77) | 7.74 | 5.26 |

[a] Solvent: CDCl₃.

TABLE VIII

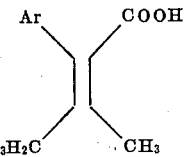

| Ar | M.p., °C. (recr. solvent) | Hydrol. conditions (hr. of reflux in 6 N hydrochloric acid-acetic acid) | Yield, percent | N.m.r. chemical shifts (τ) CH₃ and CH₂ groups[a] |
|---|---|---|---|---|
| C₆H₅ | 103–105 (n-C₆H₁₄) | 2.5 for CH₃ ester; 15 min. for t-C₄H₉ ester. | 32, 46 | 7.77, 6.33 |
| p-ClC₆H₄ | Oil | 2×6 | 37 | 7.78, 6.35 |
| 2,4-Cl₂C₆H₃ | Oil | 2×6 | 40 | 7.65, 6.37 |
| o-ClC₆H₄ | 100–101.5 (n-C₆H₁₄) | 2×6 | 36 | 7.64, 6.35 |
| p-CH₃C₆H₄ | 60–65 (n-C₆H₁₄) | 2×2 | 16 | 7.64, 7.77, 6.29 |
| 3,4-Cl₂C₆H₃ | Oil | 6 | 38 | 7.74, 6.32 |

[a] The spectra were taken on CDCl₃ solutions.

An additional synthesis of these starting materials is outlined by the following reaction sequence:

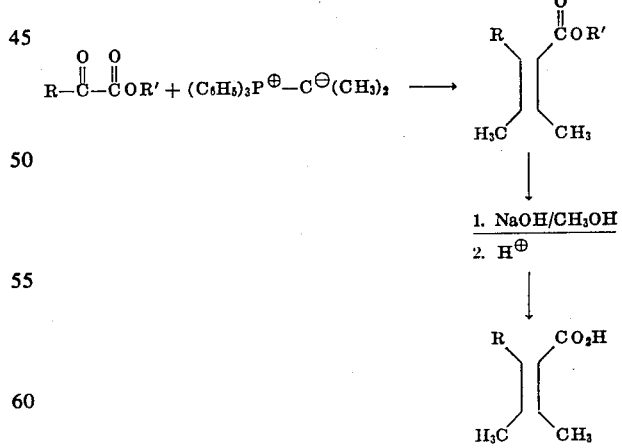

The syntheses differ from those of the other isopropylidene acids of this type in that the hydrolyses were performed with methanolic sodium hydroxide and not with acid (attempted acid hydrolyses resulted in decomposition).

Methyl 2-N-methylpyrrolylglyoxylate

A solution of oxalyl chloride (53.3 g., 0.42 mole) in 200 ml. of methylene chloride was added in portions to a stirred solution of N-methylpyrrole (32.4 g., 0.40 mole) in 500 ml. of methylene chloride. During the addition the temperature of the reaction mixture was maintained below −50°. After the addition was completed the orange colored mixture was stirred at −55° for an additional 45 minutes followed by the addition of methanol (50 ml., 1.25 mole) in one portion. The cooling bath was removed and when the temperature reached −20°, triethylamine (80.8 g., 0.80 mole) was added. The temperature was allowed to come to room temperature whereafter the reaction mixture was washed with water. The methylene chloride solution was dried (MgSO$_4$),followed by removal of the solvent and distillation of the residue *in vacuo* to give 51.8 g. (77 percent) of the product as a pale yellow liquid, b.p. 110°–100° (2.0–0.8 mm.).

Methyl 3-methyl-2-(2'-N-methylpyrrolyl)crotonate

In a nitrogen atmosphere a 1.6 M solution of The reaction (63 ml., 0.10 mole of butyllithium) was added dropwise in 30 minutes to a stirred suspension of isopropyltri-phenylphosphonium bromide (38.5 g., 0.10 mole) in 150 ml. of anhydrous tetrahydrofuran, cooled at 0°. The mixture was stirred at 0° for an additional 30 minutes, then a solution of methyl 2-N-methylpyrrolylglyoxylate (16.7 g., mole) in 25 ml. of anhydrous tetrahydrofuran was added rapidly. The reaction mixture was left at room temperature overnight. The solvent was removed and water (50 ml.) and benzene (75 ml.) were added to the residue. The benzene layer was dried (MgSO$_4$) and the benzene removed. The residue was treated with some n-hexane and the solid triphenylphosphine oxide was filtered off. Removal of the n-hexane from the filtrate, followed by distillation of the residue *in vacuo* yielded 6.4 g. (33 percent) of the product, b.p. 80°– 85° (0.8 mm.). The infrared spectrum of the neat liquid contained a strong band at 1710 cm.$^{-1}$ ascribed to the ester carbonyl group. The n.m.r. spectrum (CCl$_4$) contained a triplet at τ03.53, complex absorption at τ4.0–4.3 and singlets at τ6.43, 6.64, 7.86 and 8.32 with an integrated area ratio of 1:2:3:3:3:3 respectively.

3-Methyl-2-(2'-N-methylpyrrolyl)crotonic acid

A mixture of methyl 3-methyl-2-(2'-N-methylpyrrolyl)-crotonate (4.5 g., 0.0233 mole), 3 N methanolic sodium hydroxide (10 ml., 0.0303 mole of NaOH) and 25 ml. of methanol heated under reflux for 16 hours. The methanol lremoved and the residue treated with water (40 ml.) and ether (20 ml.). From the ether layer 1.6 g. of the starting ester was recovered. The aqueous layer was cooled and acidified with 6 N hydrochloric acid. The precipitate was filtered off, washed with some ice water, dried and recrystallized from a 1:1 mixture of benzene and n-hexane to give 1.8 g. (67 percent, based on unrecovered starting material) of off-white solid, m.p. 127°–130°. The infrared spectrum (Nujol mull) contained a strong band at 1670 cm$^{-1}$, ascribed to the carboxyl group. The n.m.r. spectrum (CDCl$_3$) contained a broad singlet at τ−2.08 (CO$_2$H), triplets at τ3.33 (couplings constant J=2 c.p.s.) and 3.85 (couplings constant J=3 c.p.s.), a quartet centered at τ4.03 (4-pyrrolyl proton) and singlets at τ6.56, 7.74 and 8.25 with an integrated area ratio of 1:1:1:1:3:3:3 respectively.

3-Methyl-2-(2'-thiazolyl)crotonic acid

Ethyl 2-thiazolylglyoxylate, b.p. 88°–90° (0.4 mm.). was obtained in 72 yield from the reaction between 2-thiazolyllithium and diethyl oxalate. Ethyl 3-methyl-2-(2'-thiazolyl)crotonate, b.p. 94°–95° (0.5 mm.), was prepared in 50 percent yield from the glyoxylic ester by the Wittig synthesis. Hydrolysis to 3-methyl-2-(2'-thiazolyl)-crotonic acid was effected by heating under reflux for 2 hours of the ester in methanolic sodium hydroxide. The acid, m.p. 124° (dec.), was obtained in 62 percent yield as a pale brown solid after recrystallization from carbon tetrachloride. The n.m.r. spectrum (CDCl$_3$) contained a broad singlet (CO$_2$H) at τ0.68, two doublets (with couplings constant J=3.5 c.p.s.) at τ2.13 and 2.55 (thiazole protons) and methyl singlets at τ7.66 and 8.00.

Another synthesis of these starting materials is outlined by the following reaction sequence:

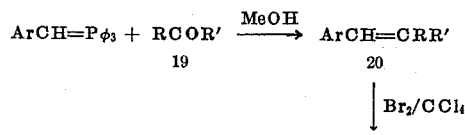

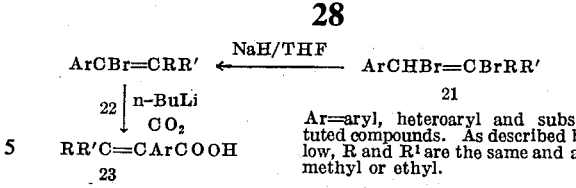

Ar=aryl, heteroaryl and substituted compounds. As described below, R and R$^1$ are the same and are methyl or ethyl.

This route consists essentially of a four-stage synthesis when Ar is phenyl, since the starting Wittig reagent, benzyltriphenyl-phosphonium chloride is commercially available from Carlisle Chemical Works Inc., Reading, Ohio. Furfuryltriphenylphosphonium bromide has recently been described (E. E. Schweizer, W. S. Creasy, K. K. Light and E. T. Shaffer, J. Org. Chem. 34, 212 (1969) as has 1,2,5-thiadiazolytriphenylphosphonium chloride (DM Mulvey and L. M. Weinstock, J. Heterocyclic Chem., 4, 445 (1967), and other similar arylmethyl and heteroarylmethyl reagents are readily available by the action of the triphenylphosphine (available from Carlisle Chemical Works) on the bromo or chloromethylarly or heteroaryl compound.

The four steps were found to proceed quite smoothly and give high yields of product, and are applicable to large scale preparations. Table IX lists two disubstituted phenylethylenes 20 prepared by this method. These reactions were done using the same time of reflux, so that the yields are indicative of the comparative steric effect of the ketones The yields can probably be improved by increasing the time of reflux.

The bromination was extremely smooth and immediate and essentially quantitative—the yields (table X) were all quantitiative since the crude products could be employed in the next step, also partial dehydrobromination may be brought about by heat. In certain cases the products were distilled, as indicated in table X.

The dehydrobromination was slow and required periodic addition of small amounts of methanol to a refluxing mixture of the dibromo compound 21 and sodium hydride in benzene. Table XI described these compounds 22.

The lithiation reaction required the use of the pure disubstituted phenylbromoethylene 22, since the use of crude material gave very low yields of acid. In every case a neutral byproduct was obtained, the n.m.r. spectrum (CCl$_4$) of which showed the presence of a butyl group. Table XII lists the acids 13 made by this method.

The experimental details on β, β-diethylatropic acid 23b are given in detail as representative of this approach.

β,β-Diethylstyrene 20b:

Freshly prepared sodium methoxide was made by dissolving sodium (11.5 g., or 0.5 g. atom) in methanol (250ml.) Benzyl-triphenylphosphonium chloride (194 g., 0.5 mole) was added slowly to the stirred sodium methoxide solution at room temperature in a nitrogen atmosphere. There was an endothermic reaction and an orange color developed. After the addition was complete, the solution was stirred an additional one-half hour, and 3-pentanone (64.5 g., 0.75 mole) was added. The stirred reaction mixture was heated under reflux for 6 hours and allowed to stand at room temperature overnight and the precipitated salt filtered and discarded. The filtrate was concentrated under reduced pressure and the resulting orange thick oil triturated with cold hexane and filtered. The solid triphenylphosphine oxide was washed with hexane. The filtrate and washings were concentrated and the resulting yellow oil distilled under reduced pressure when 44.8 g., (56 percent) of a clear oil b.p. 92°/9 mm. was obtained. The n.m.r. and i.r. spectra were in agreement with the assigned structure.

α,β-Dibromo-β-ethylphenylbutane 21b

A solution of bromine (20.5 g., 0.128 mole) in carbon tetrachloride (25 ml.) was added slowly stirred cooled solution of β,β-diethylstyrene (20 g., 0.125 mole) in carbon tetrachloride (25 ml.) at such a rate as to keep the temperature below 30° C. The reaction was exothermic and the color of bromine was discharged immediately. After the addition was complete the mixture was concentrated under reduced pressure to given a quantitative yield of the product. The i.r.

and n.m.r. spectra were in agreement with the assigned structure.

α-Bromo-β,β-diethylstyrene 22b

Sodium hydride (6.1 g. of a 56 percent oil suspension, 0.14 mole), prewashed with hexane was suspended in dry benzene (200 ml.) and α,β-dibromo-β-ethylphenylbutane (40 g., 0.125 mole) added. The mixture was stirred and heated under relfux for 12 hours with periodic addition of small amounts of methanol (ca., 3 ml. portions every one-half hour). There was a slow gas evolution during this period. The reaction mixture was allowed to cool, water (200 ml.) was added, and the benzene layer separated and dried over magnesium sulfate. After removal of the benzene the residual oil was distilled under reduced pressure to give 18.3 g., (64 percent) of a clear oil, b.p. 64°–68 °/0.3 mm. The n.m.r. and i.r. spectra were in agreement with the assigned structure.

β,β-Diethylatropic acid 23b n-Butyllithium in hexane (9.4 ml. of a 1.6 molar solution, 0.015 mole) was added slowly to a stirred, cold (−65° C.) solution of α-bromo-β,β-diethylstyrene (2.9 g., 0.012 mole) in dry THF (100 ml.) in a nitrogen atmosphere. There was an exothermic reaction and the clear colorless solution became a pale yellow color. After 1 hour at −65° C., the reaction mixture was stirred into a large excess of well powdered dry ice ($CO_2$) and allowed to come to room temperature. On concentration under reduced pressure a waxy white solid resulted. This solid was shaken with water (ca. 30 ml.) and extracted with ether (3×20 ml.). The ether extracts were discarded; the aqueous layer was made acid and extracted with ether (3×25 ml.). These ether extracts were dried and concentrated, to give 1.9 g., (76 percent) of a white solid, which on crystallization from hexane had a m.p. 104°– 106° C. The n.m.r. and i.r. were in agreement with the assigned structure. Analysis, calcd. for $C_{13}H_{16}O_2$; C=76.47, H=7.84. Found: C=76.26, H=7.69.

We claim:

1. A penicillin having the formula

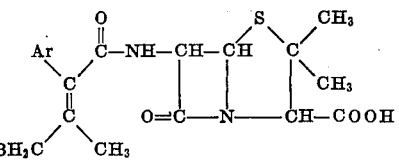

wherein B is amino or azido and Ar is

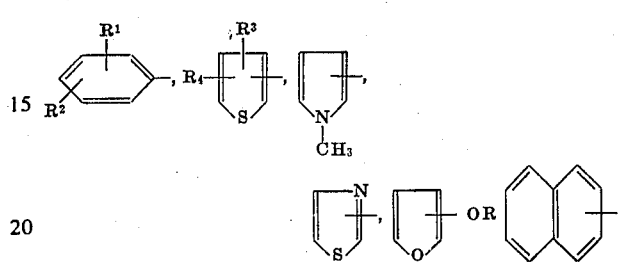

in which $R^1$ and $R^2$ are each hydrogen, fluoro, chloro, methoxy or methyl and $R^3$ and $R^4$ are each hydrogen bromo or chloro; or a nontoxic, pharmaceutically acceptable salt thereof.

2. A compound of claim 1 wherein B is azido.
3. A compound of claim 1 wherein B is amino.
4. A penicillin having the formula

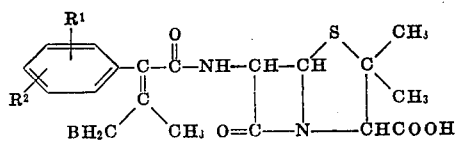

TABLE IX
ArCH=CRR' 20

| No. | Ar | R | R' | B.P.° C./mm. | Yield, percent | N.m.r. spectrum (CCl₄) |
|---|---|---|---|---|---|---|
| 20a | —⟨O⟩— | —CH₃ | —CH₃ | 64/9 | 83 | τ2.90 (s, phenyl protons), τ3.80 (broad, olefinic H), τ8.13 and τ8,19 (two doublets, —CH₃). |
| 20b | —⟨O⟩— | —C₂H₅ | —C₂H₅ | 92/9 | 56 | τ2.83 (s, phenyl protons), τ3.78 (broad, olefinic H), τ7.82 (m,—CH₂CH₃), τ8.93 (two triplets,—CH₂CH₃). |

TABLE X
ArCHBr·CBrRR' 21

| No. | Ar | R | R' | Yield(a) | N.m.r. (CCl₄) |
|---|---|---|---|---|---|
| 21a | —⟨O⟩— | —CH₃ | —CH₃ | (b) | τ2.67 (multiplet, phenyl protons), τ4.78 (s, 1H), τ8.02 (s, CH₃), τ8.13 (s,—CH₃). |
| 21b | —⟨O⟩— | —C₂H₅ | —C₂H₅ | | τ2.70 (multiplet, phenyl protons), τ4.72 (s,1H), τ8.02 (multiplet, —CH₂CH₃); τ8.93 (multiplet, —CH₂CH₃). | a Yield quantitative since the crude product was used.
b This compound could be distilled, B.P. 94-110°/0.5 to 0.3 mm. in 94% yield.

TABLE XI
ArCBr=CRR' 22

| No. | Ar | R | R' | B.P., °C./mm. | Yield, percent | N.m.r. (CCl₄) |
|---|---|---|---|---|---|---|
| 22A | —⟨O⟩— | —CH₃ | —CH₃ | 52-58/0.3 | 85 | τ 2.77 (s, phenyl protons), τ 7.99 (s,—CH₃), τ 8.3² (s,—CH₃). |
| 22b | —⟨O⟩— | —C₂H₅ | —C₂H₅ | 64-68/0.3 | 64 | τ 2.82 (s, phenyl protons), τ 7.68 and τ 8,03 (two multiplets, —CH₂CH₃), τ 8.89 and τ 9.07 (two triplets —CH₂CH₃). |

TABLE XII
RR'C=CArCOOH 23

| No. | Ar | R | R' | M.P., °C. | Yield, percent | N.m.r. (CCl₄) or (CDCl₃) |
|---|---|---|---|---|---|---|
| 23a | —⟨O⟩— | —CH₃ | —CH₃ | 151-153 | 61 | τ—2.13 (—COOH), τ 2.70 (multiplet, phenyl protons), τ 7.78 (s, —CH₃), τ 8.32 (s, —CH₃), |
| 23b | —⟨O⟩— | —C₂H₅ | —C₂H₅ | 104-106 | 76 | τ 2.52 (—COOH), τ 2.79 (s, phenyl protons), τ 7.42 and τ 8.02 (two quartets —CH₂CH₃), τ 8.98 multiplet (—CH₂CH₃). | wherein B is amino or azido and $R^1$ and $R^2$ are each hydrogen, fluoro, chloro, methoxy or methyl; or a nontoxic, pharmaceutically acceptable salt thereof.

5. A compound of claim 4 wherein B is azido.
6. A compound of claim 4 wherein B is amino.
7. A penicillin having the formula

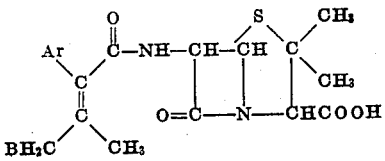

wherein B is amino or azido and Ar is 2-thienyl, 3-thienyl, 5-chloro-2-thienyl, 3,5-dichloro-2-thienyl, 3,5-dibromo-2-thienyl or 2,5-dichloro-3-thienyl; or a nontoxic, pharmaceutically acceptable salt thereof.

8. A compound of claim 7 wherein B is azido.
9. A compound of claim 7 wherein B is amino.
10. A penicillin having the formula

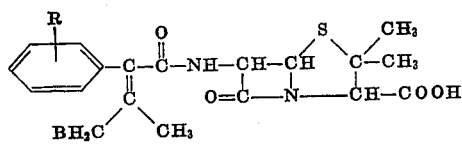

wherein B is amino or azido and R is hydrogen, fluoro, chloro, methoxy or methyl; or a nontoxic, pharmaceutically acceptable salt thereof.

11. A compound of claim 10 wherein B is azido.
12. A compound of claim 10 wherein B is amino.
13. A penicillin having the formula

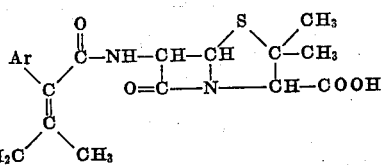

wherein B is amino or azido and Ar is

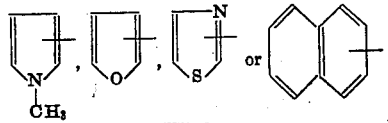

or a nontoxic, pharmaceutically acceptable salt thereof.

14. A compound of claim 13 wherein B is azido.
15. A compound of claim 13 wherein B is amino.
16. A compound of claim 2 wherein Ar is phenyl.
17. A compound of claim 2 wherein Ar is p-chlorophenyl.
18. A compound of claim 2 wherein Ar is o-chlorophenyl.
19. A compound of claim 2 wherein Ar is p-tolyl.
20. A compound of claim 2 wherein Ar is 2,4-dichlorophenyl.
21. A compound of claim 2 wherein Ar is 3,4-dichlorophenyl.
22. A compound of claim 3 wherein Ar is phenyl.
23. A compound of claim 3 wherein Ar is p-chlorophenyl.
24. A compound of claim 3 wherein Ar is o-chlorophenyl.
25. A compound of claim 3 wherein Ar is p-tolyl.
26. A compound of claim 3 wherein Ar is 2,4-dichlorophenyl.
27. A compound of claim 3 wherein Ar is 3,4-dichlorophenyl.

* * * * *